(12) United States Patent  
Karjee et al.

(10) Patent No.: US 11,916,755 B2  
(45) Date of Patent: Feb. 27, 2024

(54) METHOD AND DEVICE FOR EXECUTION OF DEEP NEURAL NETWORK IN IOT EDGE NETWORK

(71) Applicant: Samsung Electronics Co., Ltd., Suwon-si (KR)

(72) Inventors: Jyotirmoy Karjee, Bangalore (IN); Kartik Anand, Bangalore (IN); Vanamala Narasimha Bhargav, Bangalore (IN); Praveen Naik S, Bangalore (IN); Ramesh Babu Venkat Dabbiru, Bangalore (IN); Srinidhi N, Bangalore (IN); Anshuman Nigam, Bangalore (IN); Rishabh Raj Jha, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 111 days.

(21) Appl. No.: 17/703,296

(22) Filed: Mar. 24, 2022

(65) Prior Publication Data

US 2022/0311678 A1  Sep. 29, 2022

Related U.S. Application Data

(63) Continuation of application No. PCT/KR2022/004085, filed on Mar. 23, 2022.

(30) Foreign Application Priority Data

Mar. 24, 2021 (IN) .............................. 202141012716  
Feb. 28, 2022 (IN) .............................. 2021 41012716

(51) Int. Cl.  
G06F 15/16 (2006.01)  
H04L 41/16 (2022.01)  
(Continued)

(52) U.S. Cl.  
CPC .......... *H04L 41/16* (2013.01); *H04L 43/0888* (2013.01); *H04L 67/10* (2013.01)

(58) Field of Classification Search  
CPC ...... H04L 41/16; H04L 43/0888; H04L 67/10  
See application file for complete search history.

(56) References Cited

U.S. PATENT DOCUMENTS

2017/0337918 A1  11/2017  Xue et al.  
2019/0042878 A1   2/2019  Sheller et al.  
(Continued)

FOREIGN PATENT DOCUMENTS

CN    111225375 A      6/2020  
WO    2018/039238 A1   3/2018

OTHER PUBLICATIONS

Saguil et al.; A Layer-Partitioning Approach for Faster Execution of Neural Network-Based Embedded Applications in Edge Networks; IEEE Access; vol. 8, 2000; Mar. 17, 2020.

(Continued)

*Primary Examiner* — Yves Dalencourt  
(74) *Attorney, Agent, or Firm* — Jefferson IP Law, LLP

(57) ABSTRACT

A method and device for execution of deep neural network (DNN) in an internet of things (IoT) edge network are provided. In an embodiment, at least one edge device within communication range of an IoT device are selected. Further, a network for connecting the IoT device with the at least one selected edge device is identified. A split ratio is determined based on an inference time of the DNN and a transmission time required for transmitting output of each layer of DNN from the IoT device to the selected at least one edge device. Finally, a plurality of layers of the DNN are split into a first part and a second part based on the split ratio, and the second part is transmitted to the selected at least one edge device through the identified network. The first part is executed on (Continued)

the IoT device, and the second part is executed on the selected at least one edge device.

19 Claims, 16 Drawing Sheets

(51) Int. Cl.
*H04L 43/0888* (2022.01)
*H04L 67/10* (2022.01)

(56) References Cited

U.S. PATENT DOCUMENTS

| | | | |
|---|---|---|---|
| 2019/0140933 A1* | 5/2019 | Guim Bernat | ...... H04L 47/2425 |
| 2019/0220703 A1 | 7/2019 | Prakash et al. | |
| 2019/0362227 A1 | 11/2019 | Seshadri et al. | |
| 2020/0311546 A1 | 10/2020 | Lee et al. | |
| 2021/0065010 A1 | 3/2021 | Pfeil | |
| 2022/0300618 A1* | 9/2022 | Ding | ...................... G06F 21/60 |
| 2023/0053575 A1* | 2/2023 | Marche | ................ G06F 9/5027 |

OTHER PUBLICATIONS

Liu et al.; Dynamic Task Offloading and Resource Allocation for Ultra-Reliable Low-Latency Edge Computing; arXiv:1812.08076v2 [cs.NI]; May 18, 2020.
Gao et al.; Q-Learning-Based Task Offloading and Resources Optimization for a Collaborative Computing System; IEEE Access; vol. 8, 2000; Aug. 12, 2020.
International Search Report with Written Opinion dated Jun. 16, 2022; International Appln. No. PCT/KR2022/004085.
Indian Office Action dated Feb. 23, 2023; Indian Appln. No. 202141012716.

* cited by examiner

METHOD AND DEVICE FOR EXECUTION OF DEEP NEURAL NETWORK IN IOT EDGE NETWORK

CROSS-REFERENCE TO RELATED APPLICATION(S)

This application is a continuation application, claiming priority under § 365(c), of an International application No. PCT/KR2022/004085, filed on Mar. 23, 2022, which is based on and claims the benefit of an Indian Provisional patent application number 202141012716, filed on Mar. 24, 2021, in the Indian Patent Office, and of an Indian Complete patent application number 202141012716, filed on Feb. 28, 2022, in the Indian Patent Office, the disclosure of each of which is incorporated by reference herein in its entirety.

TECHNICAL FIELD

The disclosure relates to internet of things (IoT) connectivity. More particularly, the disclosure relates to a method and device for execution of deep neural network (DNN) in an IoT edge network.

BACKGROUND

Considering the implementation of 5th generation (5G) technologies at present, researchers and engineers are actively working together to provide the structure of next generation wireless system, namely 6th generation (6G). We expect that 6G can provide high speed computation & communication services to wirelessly connected Internet of Things (IoT) devices. In the 6G era, it is expected that both computation and communication aspects can go hand-in-hand to provide the growth for wireless system for artificial intelligence (AI), robotics and industrial automation, etc. The mega-trend towards 6G era is expected to provide much faster network connectivity speed that can dramatically change today's computation and communication aspects on devices such as IoT devices, edge devices and cloud servers, etc.

In the 6G era, wireless systems can process various applications such as augmented reality (AR), virtual reality (VR), extended reality (XR) and holographic communications to provide real-time user experiences. However, fulfilling the computational requirements for these applications on IoT devices is itself a challenging task. An IoT device can be any gadget which has low computational capability such as smart phone, Raspberry Pi, drones, and robots, etc. To mitigate the issue of limited computation capability on devices, we consider the concept of "Split Computing" as mentioned in to make sure that computational task can be split or distributed among nearby devices. Further, the computational tasks (i.e., deep neural network (DNN) based tasks) can be available and offloaded to network devices (for example, IoT devices, edge devices and cloud server, etc.). Thus, split computing is defined as partitioning a DNN task as a computing resource which is divided into two or more sub models that are separately executed on two or more devices.

With split computing, it is required to fulfil the requirements of low latency for real-time user experience. To provide low latency communications, it is necessary to compute split computation task in close proximity to nearby end devices such as edge devices rather than offloading to central cloud. Edge devices are considered to be high computing nodes than IoT devices that can handle complex DNN task. Offloading the DNN task to nearby edge device can reduce latency and privacy issues, respectively. Further, sometimes the IoT devices need to take frequent decision locally in close proximity of nearby devices rather than waiting for receiving decision from remotely deployed cloud server. Thus, considering edge devices in close proximity of IoT devices can reduce latency overhead in split computing.

During poor network conditions in an indoor/outdoor scenario, the network provides unreliable connectivity. In such situations, the network connectivity gets interrupted/disconnected due to which the user experiences poor real-time applications for DNNs applications (such as online video gaming and video surveillance, etc.). To address this unreliable communication between IoT-edge, it is necessary to develop an intelligent mechanism to switch to a suitable network among the available cellular (3rd generation (3G)/4th generation (4G)/5G), wireless fidelity (Wi-Fi) and Bluetooth networks, respectively. Further, Bluetooth is considered in the close proximity among IoT-edge device as Bluetooth connectivity doesn't require internet. Bluetooth connection is easily accessible in smart home application where IoT device can offload DNN to the edge device without internet. Thus, Bluetooth can help to save the internet cost.

In recent years, the deep learning models are pushed from cloud server to local edge to get benefited of real-time and quick responses along with ensuring the network security. Sometime data offloading duration (i.e., latency time) increases as well as applications finishing deadline requirements are not fulfilled according to the specific timeline. This is due to poor network coverage and signal strength, respectively in an indoor and outdoor scenario. In such a situation, uploading data to nearby edge device is necessary. Thus, efforts have been made to push DNN inference to edge device rather than deploying to remote cloud server. Edge devices are becoming popular to perform deep learning task. However, deep learning algorithms are computationally heavy, making edge devices insufficient to handle the task which requires tremendous amount of computation. On the other hand, today's IoT devices are incapable of handling deep learning approach due to the lack of memory, space and computational speed, etc.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method for execution of deep neural network (DNN) tasks in an internet of things (IoT)-edge network. The method comprises selecting, by an IoT device, at least one edge device from a plurality of edge devices within communication range of the IoT device based on network conditions and computational latency associated with the plurality of edge devices. Further, the method comprises identifying a network for connecting the IoT device with the selected at least one edge device. Thereafter, the method comprises determining a split ratio based on at least one of an inference time of the DNN and a transmission time required for transmitting output of each layer of the DNN from the IoT device to the selected at least one edge device. Finally, the method comprises splitting a plurality of layers of the DNN into a first part and a second part based on the determined split ratio, and transmitting the second part to the selected at least one edge device through the identified network, wherein the first part is executed on the IoT device and the second part is executed on the selected at least one edge device.

Another aspect of the disclosure is to provide an IoT device for execution of DNN in an IoT-edge network. The IoT device comprises a transceiver, at least one processor and a memory. The memory is communicatively coupled to the at least one processor and stores processor-executable instructions, which when executed by the at least one processor, cause the at least one processor to select at least one edge device from a plurality of edge devices within communication range of the IoT device. Further, the instructions cause the at least one processor to identify a network for connecting the IoT device with the selected at least one edge device. Thereafter, the instructions cause the at least one processor to determine a split ratio based on at least one of an inference time of the DNN and a transmission time required for transmitting output of each layer of the DNN from the IoT device to the selected at least one edge device. Finally, the instructions cause the at least one processor to split a plurality of layers of the DNN into a first part and a second part based on the determined split ratio, and transmitting the second part to the selected at least one edge device through the identified network, wherein the first part is executed on the IoT device and the second part is executed on the selected at least one edge device.

Additional aspects will be set forth in part in the description which follows and, in part, will be apparent from the description, or may be learned by practice of the presented embodiments.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE ACCOMPANYING DRAWINGS

The above and other aspects, features, and advantages of certain embodiments of the disclosure will be more apparent from the following description taken in conjunction with the accompanying drawings, in which.

Figure 6A:
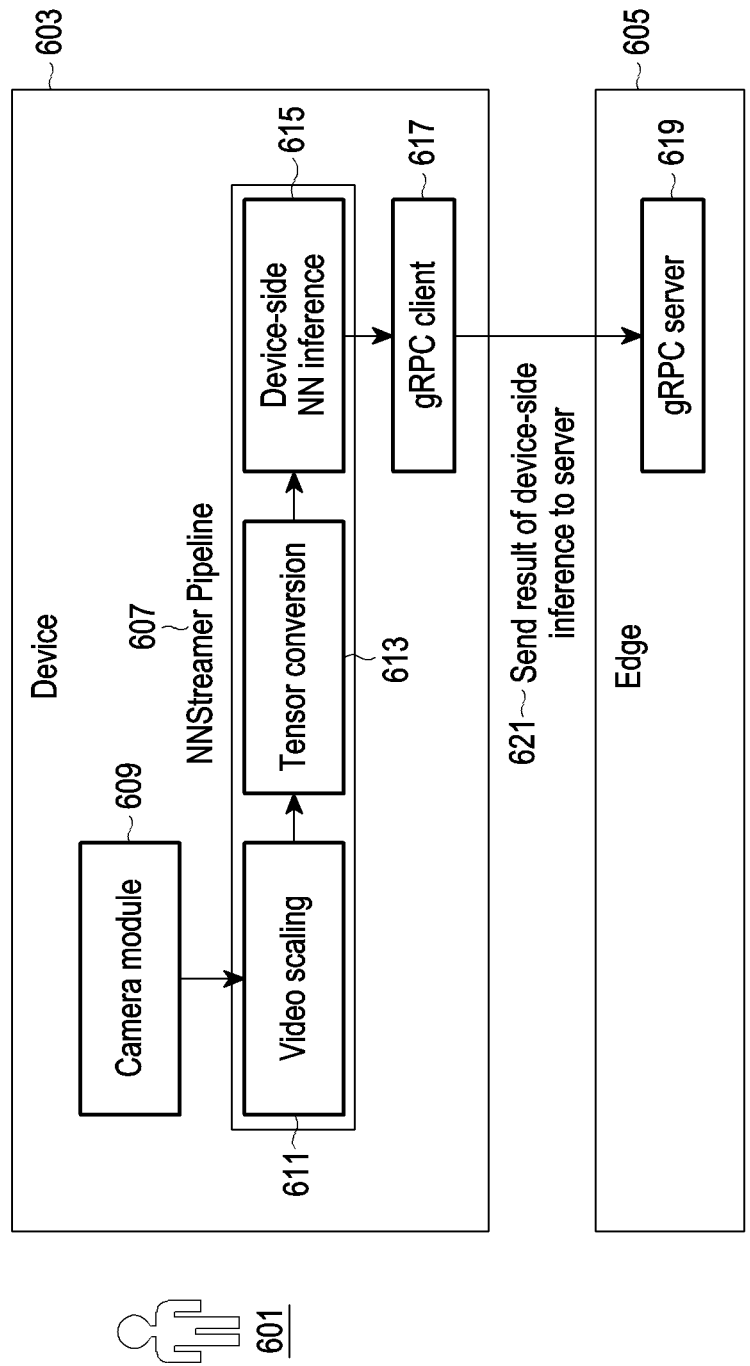
Figure 6B:
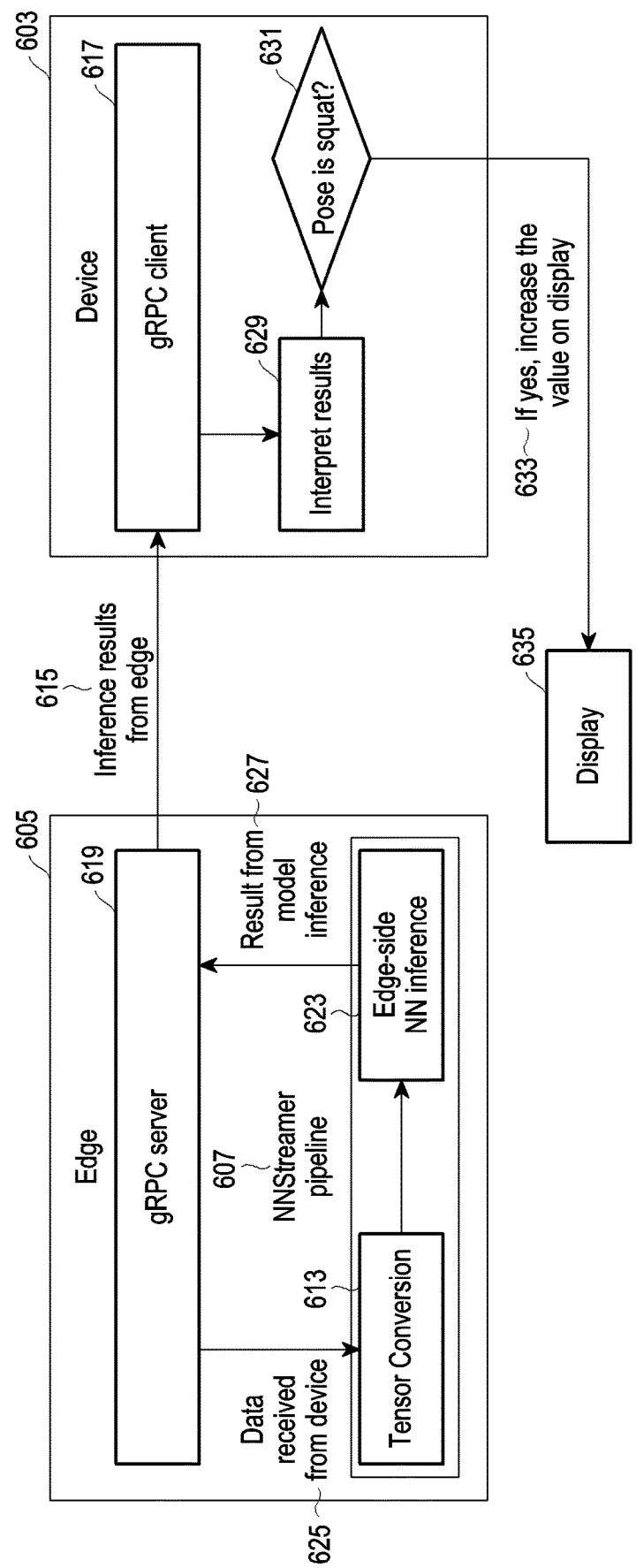
Figure 6C:
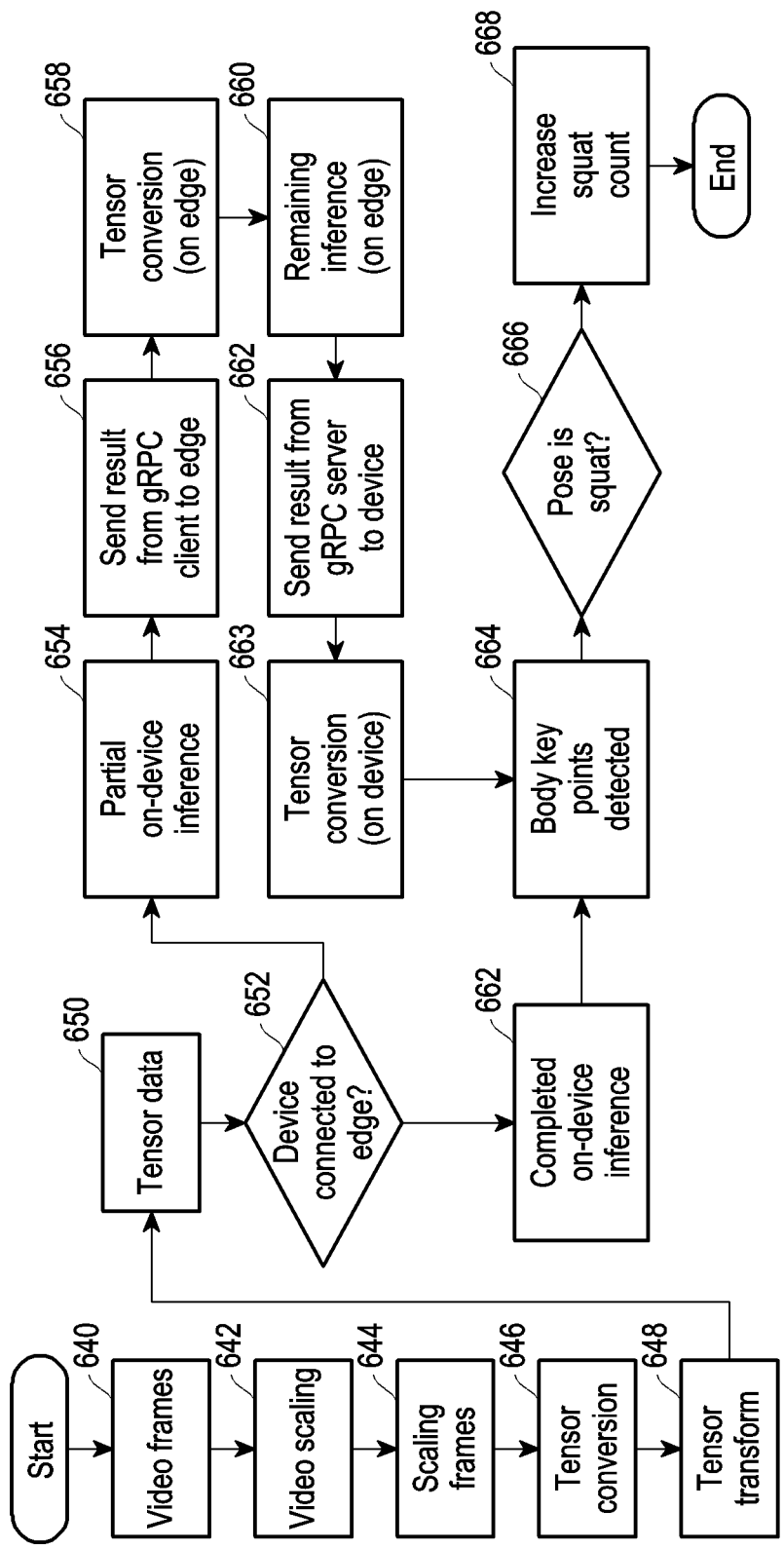
Figure 8:
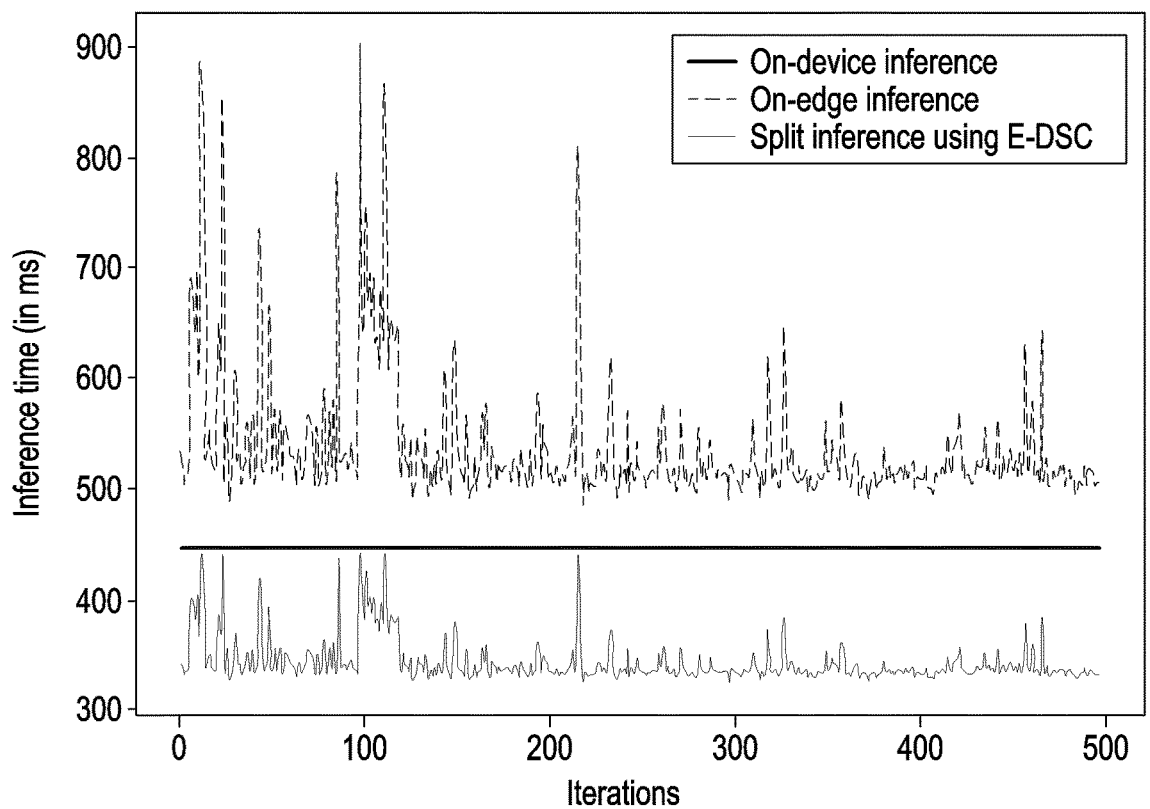
Figure 9:
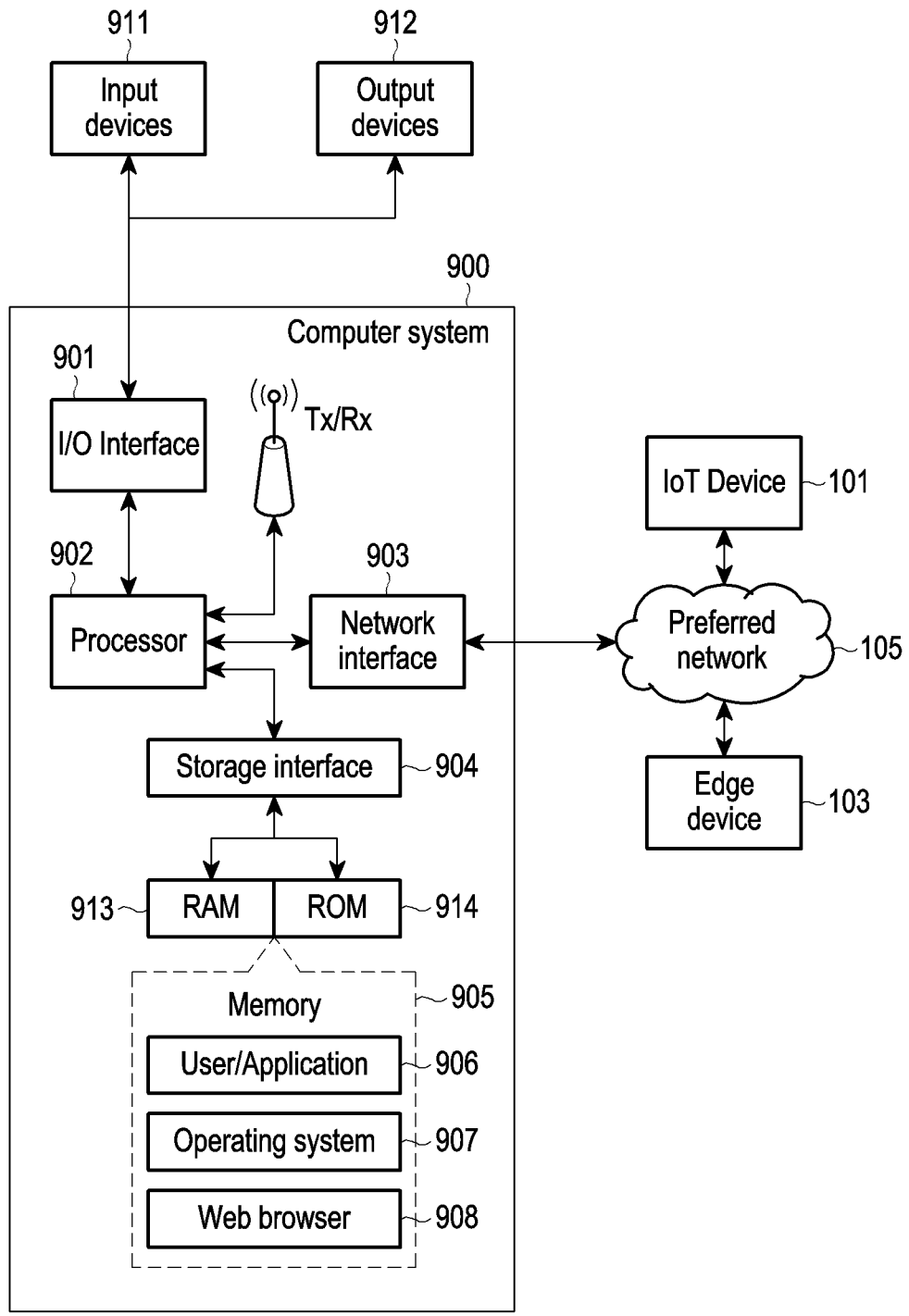

FIGS. 6A, 6B, and 6C illustrate an end-to-end architecture of fitness application based on extended dynamic split computation (E-DSC) algorithm, according to various embodiments of the disclosure;

FIGS. 7A, 7B, 7C, 7D, 7E, and 7F show flow diagrams illustrating a method of setting up suitable network connectivity and split computing inference time, according to various embodiments of the disclosure;

FIG. 8 shows a comparison of inference time computed on device, on edge and split-inference based on throughput, according to an embodiment of the disclosure; and FIG. 9 illustrates a block diagram of a computer system for implementing embodiments consistent according to an embodiment of the disclosure.

Throughout the drawings, like reference numerals will be understood to refer to like parts, components, and structures.

It should be appreciated by those skilled in the art that any block diagrams herein represent conceptual views of illustrative systems embodying the principles of the disclosure. Similarly, it will be appreciated that any flow charts, flow diagrams, state transition diagrams, pseudo code, and the like represent various processes which may be substantially represented in a non-transitory computer readable medium and executed by a computer or processor, whether such computer or processor is explicitly shown.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the disclosure, the word "exemplary" is used herein to mean "serving as an example, instance, or illustration." Any embodiment or implementation of the disclosure described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the specific forms disclosed, but on the contrary, the disclosure is to cover all modifications, equivalents, and alternative falling within the scope of the disclosure.

The terms "comprises", "comprising", "includes", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The disclosure relates to a method for execution of deep neural network (DNN) in an internet of things (IoT)-edge network. In an embodiment, the proposed method selects at least one edge device from a plurality of edge devices within a communication range of the IoT device based on network conditions and computational latency associated with the plurality of edge devices. Further, the method identifies the preferred network for connecting the IoT device with the selected edge device based on available bandwidth and historical inference time records of a plurality of networks associated with the IoT device. Further, an optimal split ratio is determined for splitting a plurality of layers of the DNN into a first part and a second part based on at least one of an inference time of the DNN and a transmission time required for transmitting output of each layer of the DNN from the IoT device to the selected edge device. In an embodiment, the DNN is split according to the optimal split ratio and the second part of the DNN is transmitted to the selected edge device, the first part of the DNN is executed on the IoT device and the second part of the DNN is executed on the selected edge device.

In an embodiment, the proposed method takes in input parameters including, but without limiting to, network bandwidth, network channel quality or network channel condition of a network connecting the edge device and the IoT device to: (1) select a most appropriate communication path or protocol among multiple available paths/protocols to establish a connective between the edge device and the IoT device, and (2) dynamically determine a distribution/split ratio for splitting the processing load between the edge device and the IoT device based on the selected path/protocol.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the disclosure. The following description is, therefore, not to be taken in a limiting sense.

Figure 1:
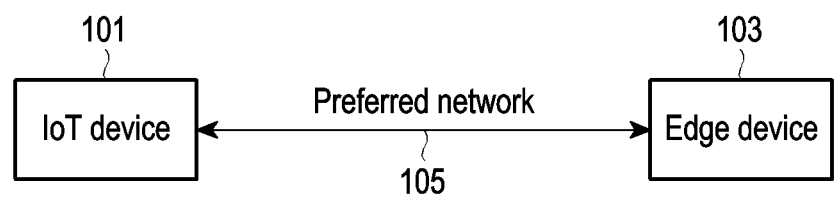
FIG. 1 shows an illustration of communication between an internet of things (IoT) device and an edge device according to an embodiment of the disclosure.

FIG. 1 shows an illustration of communication between an IoT device and an edge device according to an embodiment of the disclosure.

Referring to FIG. 1, at least one edge device, for example, an edge device 103 is selected from a plurality of edge devices 103 by an IoT device 101 for execution of DNN in an IoT-edge network. The edge device 103 is within the communication range with the IoT device 101. The edge device 103 is selected based on network conditions and computational latency. As an example, the IoT device 101 may be a low-cost computing device and edge device 103 may be a high-cost computing device such as without limiting to, a smartphone, a laptop and/or any other computing device capable of being connected to a telecommunication network. In an embodiment, a preferred network 105 is identified for connecting the IoT device 101 with the selected edge device 103. The preferred network 105 is identified based on available bandwidth and historical inference time records of a plurality of networks associated with the IoT device 101. As an example, the network may be without limiting to, Wi-Fi, Bluetooth and cellular networks. In an embodiment, at least one of a rule-based reliable network switching, learning-based reliable network switching, and manual network switching is used to identify the preferred network 105.

In an embodiment, the reliable communication network switching (RCNS) mechanism provides reliable connectivity during poor network condition. RCNS may leverage network selection to decide whether to connect to not limiting to Cellular, Wi-Fi or Bluetooth network based on the available bandwidth to reduce communication overhead. In an embodiment, the learning-based RCNS (L-RCNS) comprises training a machine learning model based on bandwidth data related to the plurality of networks. Using the trained machine learning model one of the plurality of networks is selected by analyzing time taken by each of the plurality of networks to complete a reference DNN inference. In an embodiment, the rule-based RCNS (R-RCNS) identifies a network having the highest bandwidth availability as the preferred network 105. R-RCNS helps to reduce the switching time and may mitigate the network connectivity interruption.

In an embodiment, an optimal split ratio for splitting a plurality of layers of the DNN is determined by the IoT device 101. The plurality of DNN layers is split into two parts based on at least one of an inference time of the DNN and transmission time. The transmission time is the time required for transmitting output of each layer of the DNN from the IoT device 101 to the selected edge device 103. In an embodiment, the optimal split ratio is determined based on one or more inference parameters. In an embodiment, the one or more inference parameter may comprise a predetermined computation time of each layer of the DNN on the IoT device 101 obtained by benchmarking the DNN layers on the IoT device 101. In an embodiment, the one or more inference parameter may comprise, a predetermined computation time of each layer of the DNN on the edge device 103 obtained by benchmarking the DNN on the edge device 103. In an embodiment, the one or more inference parameter may comprise the throughput of the identified preferred network 105 determined based on a response time of a message sent from the IoT device 101 to the edge device 103.

In an embodiment, the throughput of the identified preferred network 105 is re-computed periodically. The optimal split ratio is dynamically modified based on variations in the one or more inference parameters. In an embodiment, the DNN is split based on the optimal split ratio. The second part of the DNN is transmitted to the selected edge device 103. In an embodiment, the first part of the DNN is executed on the IoT device 101 and the second part of the DNN is executed on the selected edge device 103.

Figure 2:
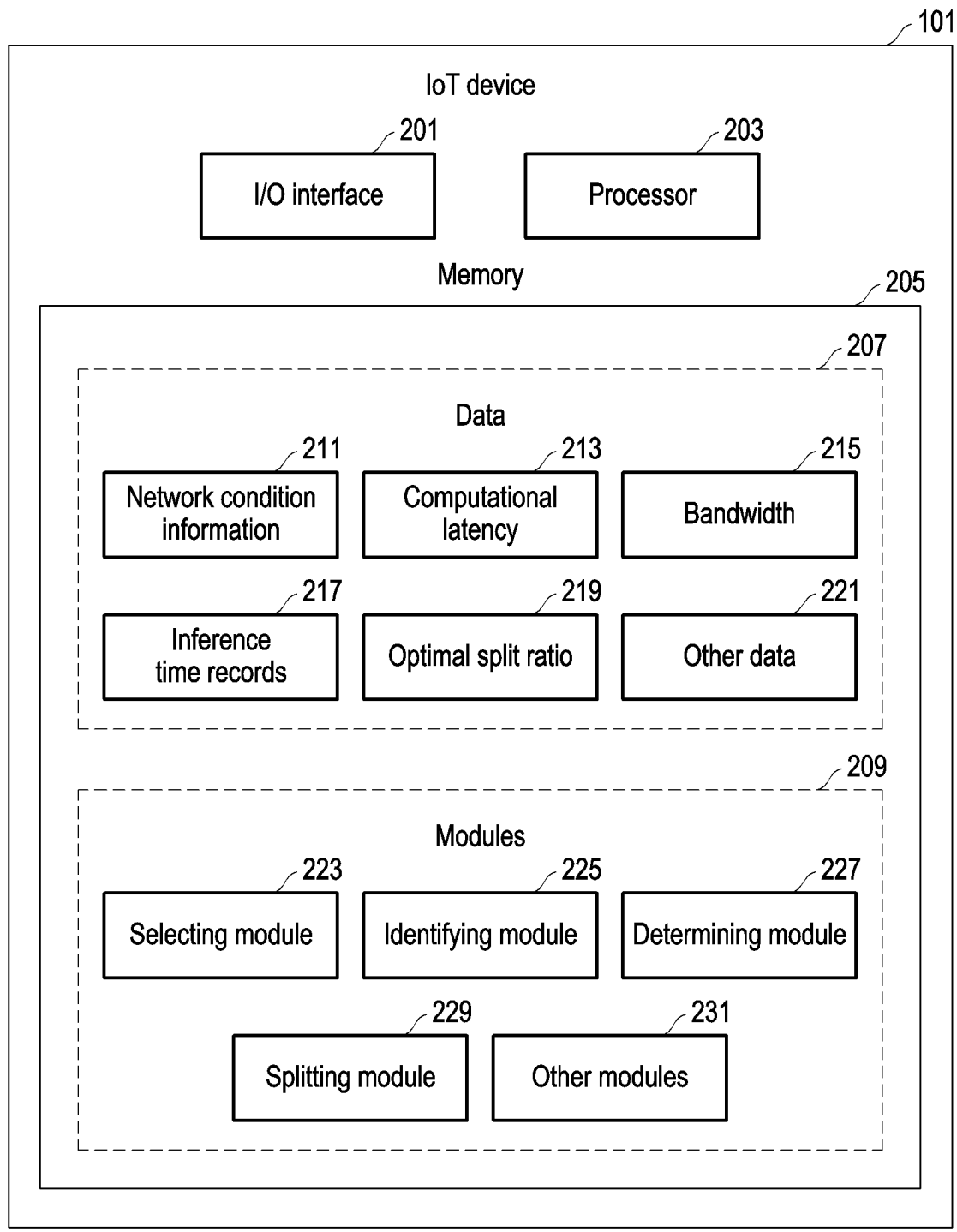
FIG. 2 shows a detailed block diagram of an IoT device, according to an embodiment of the disclosure.

FIG. 2 shows a detailed block diagram of an IoT device, according to an embodiment of the disclosure.

In some implementations, the IoT device 101 may include an input/output (I/O) interface 201, a processor 203 and a memory 205. The processor 203 may be configured to perform one or more functions of the IoT device 101 for execution of DNN in an IoT-edge network, using the data 207 and the one or more modules 209 in stored in a memory 205 of the base station. In an embodiment, the memory 205 may store data 207 and one or more modules 209.

Referring to FIG. 2, the data 207 stored in the memory 205 may include, without limitation, one or more network condition information 211, a computational latency 213, a bandwidth 215, an inference time records 217, an optimal split ratio 219 and other data 221. In some implementations, the data 207 may be stored within the memory 205 in the form of various data structures. Additionally, the data 207 may be organized using data models, such as relational or hierarchical data models. The other data 221 may include various temporary data and files generated by the one or more modules 209.

In an embodiment, the one or more network condition information 211 are the parameters based on which the preferred network 105 may be selected. As an example, the one or more network condition information 211 may include, without limitation, available bandwidth and historical inference time records. In an embodiment, the network condition information 211 may be used for selecting at least one edge device.

In an embodiment, the computational latency 213 may indicate the amount of time the plurality of edge devices takes for a packet of data to be captured, transmitted, processed through the plurality of edge devices. In an embodiment, the computational latency 213 may be used for selecting at least one edge device.

In an embodiment, the bandwidth 215 may be a maximum amount of data transmitted over an internet connection in a given amount of time. The bandwidth 215 may be used in identifying the preferred network for connecting the IoT device with the selected edge device based on available bandwidth. The learning based reliable network switching trains a machine learning model based on bandwidth data related to the plurality of networks. The rule-based network switching identifies a network having highest bandwidth availability as the preferred network.

In an embodiment, the inference time records 217 may be the time taken for a forward propagation in the DNN. Based on the inference time taken for each layer in DNN model, a trade-off is found between computational resource and network reliability to compute execution time on-device and execution time on edge to get the optimal point for splitting the computation.

In an embodiment, the optimal split ratio 219 may be the partition ratio for splitting a plurality of layers of the DNN into a first part and a second part based on at least one of an inference time of the DNN and a transmission time. The first part of the DNN is executed on the IoT device and the second part of the DNN is executed on the selected edge device.

In an embodiment, the data 207 may be processed by the one or more modules 209 of the IoT device 101. In some implementations, the one or more modules 209 may be communicatively coupled to the processor 203 for performing one or more functions of the IoT device 101. In an implementation, the one or more modules 209 may include, without limiting to, a selecting module 223, an identifying module 225, a determining module 227, a splitting module 229 and other modules 231.

As used herein, the term module may refer to an application specific integrated circuit (ASIC), an electronic circuit, a hardware processor (shared, dedicated, or group) and memory that execute one or more software or firmware programs, a combinational logic circuit, and/or other suitable components that provide the described functionality. In an implementation, each of the one or more modules 209 may be configured as stand-alone hardware computing units. In an embodiment, the other modules 231 may be used to perform various miscellaneous functionalities on the IoT device 101. It will be appreciated that such one or more modules 209 may be represented as a single module or a combination of different modules.

In an embodiment, the selecting module 223 may be configured for selecting at least one edge device from a plurality of edge devices within a communication range of the IoT device based on network conditions and computational latency associated with the plurality of edge devices. In an embodiment, the identifying module 225 may be configured for identifying the preferred network for connecting the IoT device with the selected edge device based on available bandwidth and historical inference time records of a plurality of networks associated with the IoT device.

In an embodiment, the determining module 227 may be configured for determining the optimal split ratio for splitting a plurality of layers of the DNN into a first part and a second part based on at least one of an inference time of the DNN and a transmission time required for transmitting output of each layer of the DNN from the IoT device to the selected edge device. In an embodiment, the splitting module 229 may be configured for splitting the DNN according to the optimal split ratio and transmitting the second part of the DNN to the selected edge device, wherein the first part of the DNN is executed on the IoT device and the second part of the DNN is executed on the selected edge device.

Figure 3:
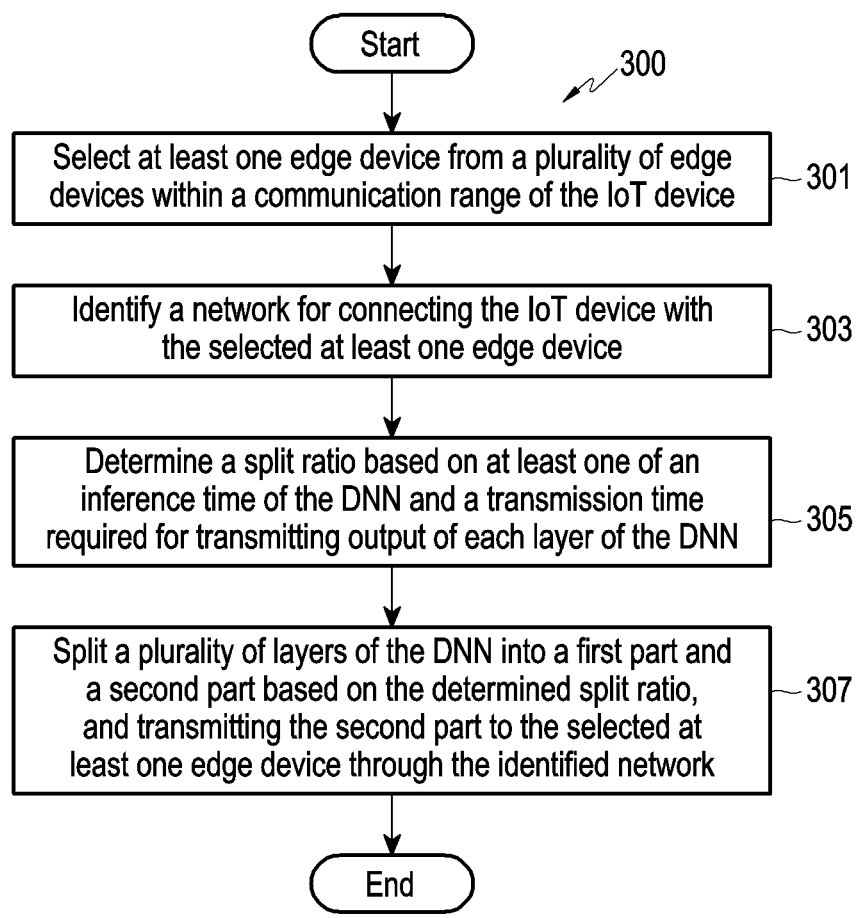
FIG. 3 shows a flowchart illustrating a method for execution and partition of deep neural network (DNN) inference in an IoT-edge network, according to an embodiment of the disclosure.

FIG. 3 shows a flowchart illustrating a method for execution of DNN in an IoT-edge network, according to an embodiment of the disclosure.

Referring to FIG. 3, the method 300 may include one or more blocks illustrating a method for execution of DNN in an IoT-edge network using an IoT device 101 illustrated in FIG. 2. The method 300 may be described in the general context of computer executable instructions. Generally, computer executable instructions may include routines, programs, objects, components, data structures, procedures, modules, and functions, which perform specific functions or implement specific abstract data types.

The order in which the method 300 is described is not intended to be construed as a limitation, and any number of the described method blocks may be combined in any order to implement the method. Additionally, individual blocks may be deleted from the methods without departing from the scope of the subject matter described herein. Furthermore, the method may be implemented in any suitable hardware, software, firmware, or combination thereof.

At operation 301, the method 300 includes selecting, by the IoT device 101, at least one edge device from a plurality of edge devices within communication range of the IoT device based on network conditions and computational latency associated with the plurality of edge devices. As an example, the IoT device may be a low-cost computing device and each edge device may be a high-cost computing device such as without limiting to, a mobile phone, a smartphone, a laptop and/or any other computing device capable of being connected to a telecommunication network.

At operation 303, the method 300 includes identifying, by the IoT device 101, a network for connecting the IoT device with the selected at least one edge device based on available bandwidth and historical inference time records of a plurality of networks associated with the IoT device. In an embodiment, the network may be identified based on at least one of a rule-based reliable network switching, learning-based reliable network switching and manual network switching.

At operation 305, the method 300 includes determining, by the IoT device 101, a split ratio the DNN based on at least one of an inference time of the DNN and a transmission time required for transmitting output of each layer of the DNN from the IoT device to the selected at least one edge device. In an embodiment, the split ratio may be determined based on one or more inference parameters. In an embodiment, the one or more inference parameter may comprise a predetermined computation time of each layer of the DNN on the IoT device obtained by benchmarking the DNN on the IoT device. In an embodiment, the one or more inference parameter may comprise, a predetermined computation time of each layer of the DNN on the selected at least one edge device obtained by benchmarking the DNN on the selected at least one edge device. In an embodiment, the one or more inference parameter may comprise the throughput of the identified network determined based on a response time of a message sent from the IoT device to the selected at least one edge device.

At operation 307, the method 300 includes splitting, by the IoT device 101, a plurality of layers of the DNN into a first part and a second part based on the split ratio, and transmitting the second part to the selected at least one edge device, wherein the first part is executed on the IoT device and the second part is executed on the selected at least one edge device. In an embodiment, the determined split ratio may be modified based on variations in the one or more inference parameters.

Figure 4A:
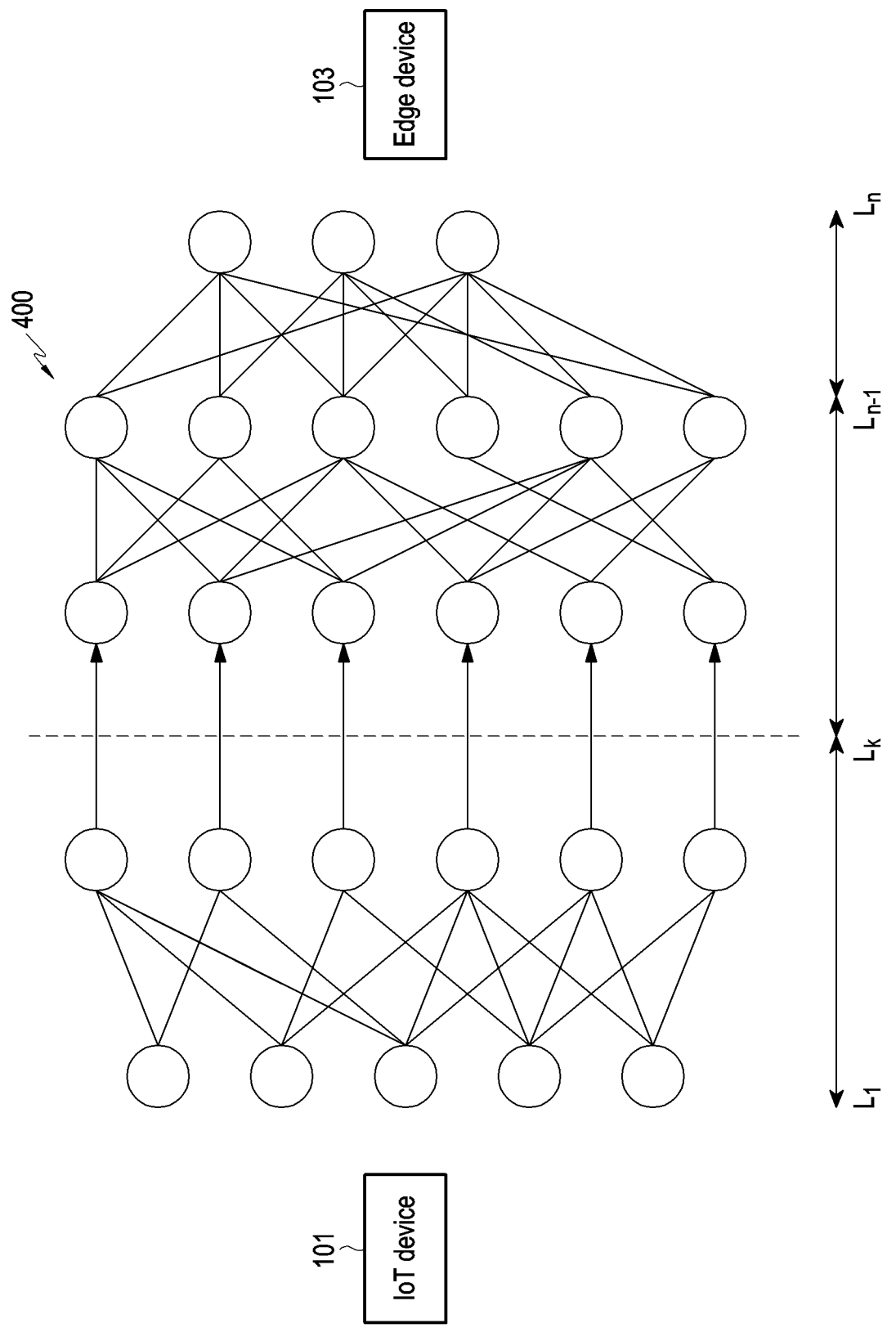
FIG. 4A shows a diagram of a DNN partitioning model inference among IoT-Edge platform using split computing, according to an embodiment of the disclosure.

FIG. 4A shows a flowchart illustrating a method of learning based Reliable Communication Network Switching according to an embodiment of the disclosure.

Referring to FIG. 4A, a dynamic split computation (DSC) mechanism is used to find an optimal splitting point of DNN layers 400. The splitting point divides the DNN layers into two parts. One inference part is computed by the IoT device 101, and another inference part is computed by the edge device 103 which is partitioned based on available bandwidth. The partition of the DNN inference is executed to optimize the execution time across two or more devices. Initially consider that $L_1, L_2, L_3, \ldots L_N$ are the layers present in the DNN model. The DNN inference is initially partitioned into a pre-defined ratio among IoT device and edge device. The computation time taken by the DNN model inference layers is calculated on device as $C_D=\{C_{D_1}, C_{D_2}, C_{D_3}, \ldots, C_{D_N}\}$ where $C_{D_i}$ is the execution time of $i^{th}$ layer on the device. The computation time taken on the edge device is defined by the model layers to execute on the edge device, which is given by $C_E=\{C_{E_1}, C_{E_2}, C_{E_3}, \ldots, C_{E_N}\}$, where $C_{E_i}$ is the execution time of $i^{th}$ layer on the edge. To split the task among IoT and edge, a consistent and reliable network connectivity is required. The consistent connectivity is considered for which the time taken to transmit the output of $i^{th}$ layer from IoT device to edge may be represented as $T=t_1, t_2, t_3, \ldots, t_N$. Let $k^{th}$ layer be the point at which the inference layer is partitioned between IoT device model and edge model. Then, the inference time on IoT device is given by; $I_D=C_{D_1}, C_{D_2}, C_{D_3}, \ldots, C_{D_K}$ the transport time of output from IoT device to edge device is given as $t_K$ and inference time on edge $I_E=C_{EK+1}+C_{EK+2}+C_{EK+3}+\ldots+C_{E_N}$. The total inference time is given as:

$$I_T = I_D + t_K + I_E \quad \text{Equation 1}$$

$$I_T = C_{D_1}+C_{D_2}+C_{D_3}+\ldots+C_{D_K}+t_K+C_{EK+1}+C_{EK+2}+C_{EK+3}+\ldots+C_{E_N} \quad \text{Equation 2}$$

In the DSC model, the transfer time from edge to IoT device may be considered, but that may be considered a constant except in the case of complete model inference on device. To minimize the total inference time $I_T$, the optimal value of K, i.e., $$I_{T_{opt}} = \arg\min_{k\in\{1,2,\ldots N\}} \{C_{D_1}+C_{D_2}+C_{D_3}, +\cdots+C_{D_K}+t_K+C_{EK+1}++C_{EK+3}+\ldots+C_{EN}\} \quad \text{Equation 3}$$

In an embodiment, after the optimal K is determined, the model layers are split amongst IoT device and edge device. The model layers to be executed on the edge are fused as a single layer, which reduces communication overhead in the IoT-edge platform.

In an embodiment, another approach to find an optimal splitting point, a deep learning model with N layers is considered. Initially IoT device chooses the nearest neighbor edge based on path-loss model to execute K optimal split computing points among IoT and edge to compute the total inference time ($I_{Total}$) which is expressed by:

$$I_{Total}=\text{ArgMin}[I_D+t_K+I_E], k\in\{1,2,\ldots,N\} \quad \text{Equation 4}$$

where $I_D$ is the inference time on IoT device to compute $I_D=C_{D1}+C_{D2}+\ldots C_{DK}$ and where $C_{Di}$ is the execution time of $i^{th}$ layer on the IoT device. Similarly, $I_E$ is the inference time on edge. To compute $I_E=C_{EK+1}+\ldots+C_{EN}$, where $C_{Ei}$ is the execution time of $i^{th}$ layer on the edge.

Finally, $t_K$ is expressed as the transport time from IoT device to edge. An array $C_D$ of size N will store the computation time of each layer on IoT device. Another array $C_E$ of size N will store the computation time of each layer on Edge device.

The arrays $C_D$ and $C_E$ are used to compute two new arrays $CS_D$ and $CS_E$ respectively, both of size N, which will store the cumulative sum of computation time. For example, the cell number I will store the sum of computation time from layer 1 to i. One more array T of size N may be used for storing the transport time of output of each layer from IoT to Edge device. Iterating for all values of K starting from 1 to N and considering each K as the splitting point, total inference time for each K may be calculated. The value of K at which the total inference time is minimum will be the optimal splitting point. Once the optimal K is determined, the model layers are split amongst IoT and Edge device.

For the layer K, the total inference time will be calculated by:

$$I_{Total}=CS_{KD}+t_K+CS_{NE}-CS_{KE} \quad \text{Equation 5}$$

Here, K for which $I_{Total}$ is minimum needs to be identified. Cell i of array $C_D$ and $C_E$ contains computation time of layer i on IoT device and Edge device respectively. Cell i of array T contains transport time of output of layer i from IoT to Edge device. Cell i of array $CS_D$ and $CS_E$ contains cumulative computation time up to layer i on IoT device and edge device respectively. Further, $CS_{KD}$ is a cumulative sum of the computation time from layer 1 to K on IoT device, $t_K$ is transport time of output of $k^{th}$ layer from an IoT device to edge device, $CS_{NE}$ is cumulative sum of the computation time from layer 1 to N on edge device and $CS_{KE}$ is cumulative sum of the computation time from layer 1 to K on edge device. This is illustrated in Table 1 below.

TABLE 1

| $C_D=$ | $C1_D$ | $C_{2D}$ | $C_{3D}$ | ... | $C_{ND}$ |
|---|---|---|---|---|---|
| $C_E=$ | $C1_E$ | $C_{2E}$ | $C_{3E}$ | ... | $C_{NE}$ |

TABLE 1-continued

| T= | $t_1$ | $t_2$ | $t_3$ | ... | $t_N$ |
|---|---|---|---|---|---|
| $CS_D=$ | $C_{1D}$ | $C_{1D} + C_{2D}$ | $C_{1D} + C_{2D} + C_{3D}$ | ... | $C_{1D} + C_{2D} + ... + C_{ND}$ |
| $CS_E=$ | $C_{1E}$ | $C_{1E} + C_{2E}$ | $C_{1E} + C_{2E} + C_{3E}$ | ... | $C_{1E} + C_{2E} + ... + C_{NE}$ |

In an embodiment, another approach to find an optimal splitting point in a deep learning model with N layers is considered. Initially an IoT device chooses the nearest neighbor edge based on path-loss model to execute K optimal split computing points among IoT and edge to compute the total inference time ($I_{Total}$) which is expressed by:

$$I_{Total} = \text{ArgMin}[I_D + t_K + I_E], k \in \{1, 2, ..., N\} \quad \text{Equation 6}$$

where $I_D$ is the inference time on IoT device to compute $I_D = C_{D1} + C_{D2} + ... + C_{DK}$ and $C_{Di}$ is the execution time of $i^{th}$ layer on the IoT device. Similarly, $I_E$ is the inference time on edge to compute $I_E = C_{EK+1} + ... + C_{EN}$ where $C_{Ei}$ is the execution time of $i^{th}$ layer on the edge. Finally, $t_K$ is expressed as the transport time from IoT device to edge.

An array $C_D$ of size N will store the computation time of each layer on IoT device. Another array $C_E$ of size N will store the computation time of each layer on Edge device. The arrays $C_D$ and $C_E$ are used to compute two new arrays $CS_D$ and $CS_E$ respectively both of size N, which will store the cumulative sum of computation time. The cell number i will store the sum of computation time from layer 1 to i. One more array T of size N will store the transport time of output of each layer from IoT to Edge device. Iterating for all values of K starting from 1 to N and considering each K as the splitting point calculate total inference time for each K and store them in another array Total Time of size N. Finding the total inference time at layer N/2 and total inference time at layer N/2−1 and N/2+1. Depending on which of the inference times is lower, the binary search may be continued in either lower or upper half. If none of them have lower value than N/2, then K=N/2 will be the optimal splitting point. Once the optimal K is determined, the model layers are split amongst IoT and Edge device.

For the layer K, the total inference time ($I_{Total}$) will be calculated by:

$$I_{Total} = CS_{KD} + t_K + CS_{NE} - CS_{KE} \quad \text{Equation 7}$$

Here, K for which $I_{Total}$ is minimum needs to be identified. Cell i of array $C_D$ and $C_E$ contains computation time of layer i on IoT device and Edge device respectively. Cell i of array T contains transport time of output of layer i from IoT to Edge device. Cell i of array $CS_D$ and $CS_E$ contains cumulative computation time up to layer i on IoT device and Edge device respectively. Cell i of array Total Time contains total inference time if layer i is considered as the splitting point. This has been summarized in Table 2 below.

TABLE 2

| $C_D=$ | $C1_D$ | $C_{2D}$ | $C_{3D}$ | ... | $C_{ND}$ |
|---|---|---|---|---|---|
| $C_E=$ | $C1_E$ | $C_{2E}$ | $C_{3E}$ | ... | $C_{NE}$ |
| T= | $t_1$ | $t_2$ | $t_3$ | ... | $t_N$ |
| $CS_D=$ | $C_{1D}$ | $C_{1D} + C_{2D}$ | $C_{1D} + C_{2D} + C_{3D}$ | ... | $C_{1D} + C_{2D} + ... + C_{ND}$ |
| $CS_E=$ | $C_{1E}$ | $C_{1E} + C_{2E}$ | $C_{1E} + C_{2E} + C_{3E}$ | ... | $C_{1E} + C_{2E} + ... + C_{NE}$ |
| Total Time | $T_1$ | $T_2$ | $T_3$ | ... | $T_N$ |

In an embodiment, another approach to find an optimal splitting point in a Deep Learning model with N layers is considered. Initially IoT device chooses the nearest neighbor edge based on path-loss model to execute K optimal split computing points among IoT and edge to compute the total inference time ($I_{Total}$) which is expressed by:

$$I_{Total} = \text{ArgMin}[I_D + t_K + I_E], k \in \{1, 2, ..., N\} \quad \text{Equation 8}$$

where $I_D$ is the inference time on IoT device to compute $I_D = C_{D1} + C_{D2} + ... + C_{DK}$ and $C_{Di}$ is the execution time of $i^{th}$ layer on the IoT device. Similarly, $I_E$ is the inference time on edge to compute $I_E = C_{EK+1} + ... + C_{EN}$, where $C_{Ei}$ is the execution time of $i^{th}$ layer on the edge.

Finally, $t_K$ is expressed as the transport time from IoT device to edge. An array $C_D$ of size N will store the computation time of each layer on IoT device. Another array $C_E$ of size N will store the computation time of each layer on Edge device. For each layer L, the difference between computation time on IoT device and Edge device ($C_{LD} - C_{LE}$) is calculated. The layer before the one for which the difference would be minimum will be taken as the splitting point. If the difference is maximum for L=K then layer till K−1 will be executed on IoT device and after that on Edge device. If L=1 then all the computations will be carried out on Edge device. Alternatively, if L=N, then all the computations will be carried out on IoT device. Once the optimal K is determined, the model layers are split amongst IoT and Edge device.

Here, K for which the difference is maximum needs to be identified. Optimal splitting point consideration will be given by K which maximizes the difference $C_{KD} - C_{KE}$. The optimization problem will be calculated by:

$$\text{ArgMin}[C_{KD} - C_{KE}], k \in \{1, 2, ..., N\} \quad \text{Equation 9}$$

The cell i of array $C_D$ and $C_E$ contains computation time of layer i on IoT device and Edge device respectively. Cell i of array T contains transport time of output of layer i from IoT to Edge device. $C_{KD}$ is computation time of layer K on IoT device and $C_{KE}$ is computation time of layer K on edge device. This has been summarized in Table 3 below.

TABLE 3

| $C_D=$ | $C1_D$ | $C_{2D}$ | $C_{3D}$ | ... | $C_{ND}$ |
|---|---|---|---|---|---|
| $C_E=$ | $C1_E$ | $C_{2E}$ | $C_{3E}$ | ... | $C_{NE}$ |
| T= | $t_1$ | $t_2$ | $t_3$ | ... | $t_N$ |

In an embodiment, yet another approach to find an optimal splitting point in a Deep Learning model with N layers is considered. Initially IoT device chooses the nearest neighbor edge based on path-loss model to execute K optimal split computing points among IoT and edge to compute the total inference time ($I_{Total}$) which is expressed by:

$$I_{Total} = \text{ArgMin}[I_D + t_K + I_E], k \in \{1, 2, ..., N\} \quad \text{Equation 10}$$

where $I_D$ is the inference time on IoT device to compute $I_D = C_{D1} + C_{D2} + ... + C_{DK}$, where $C_{Di}$ is the execution time of $i^{th}$ layer on the IoT device. Similarly, $I_E$ is the inference time on edge to compute $I_E = C_{EK+1} + ... + C_{EN}$, where $C_{Ei}$ is the execution time of $i^{th}$ layer on the edge.

Finally, $t_K$ is expressed as the transport time from IoT device to edge. The computation time on IoT device and Edge device is represented as a tree. Tree's root node will be $C_{ID}$. Each node will have N nodes attached (except leaf nodes) indicating the next layer's computation time on IoT device and one of many Edge devices. The edge that does the transition from IoT node to Edge node will have an additional weight which will represent the transport time of output from IoT device to edge device and rest all edges will have zero weights. The minimum cost path from root to leaf in that tree is calculated. While doing computation, the battery level of the Edge device is also tracked. If battery level goes below a certain threshold, the task is unloaded to some other edge device which will give minimum inference time. The splitting points are found wherever the transition is done from IoT to edge and edge to edge.

Figure 4B:
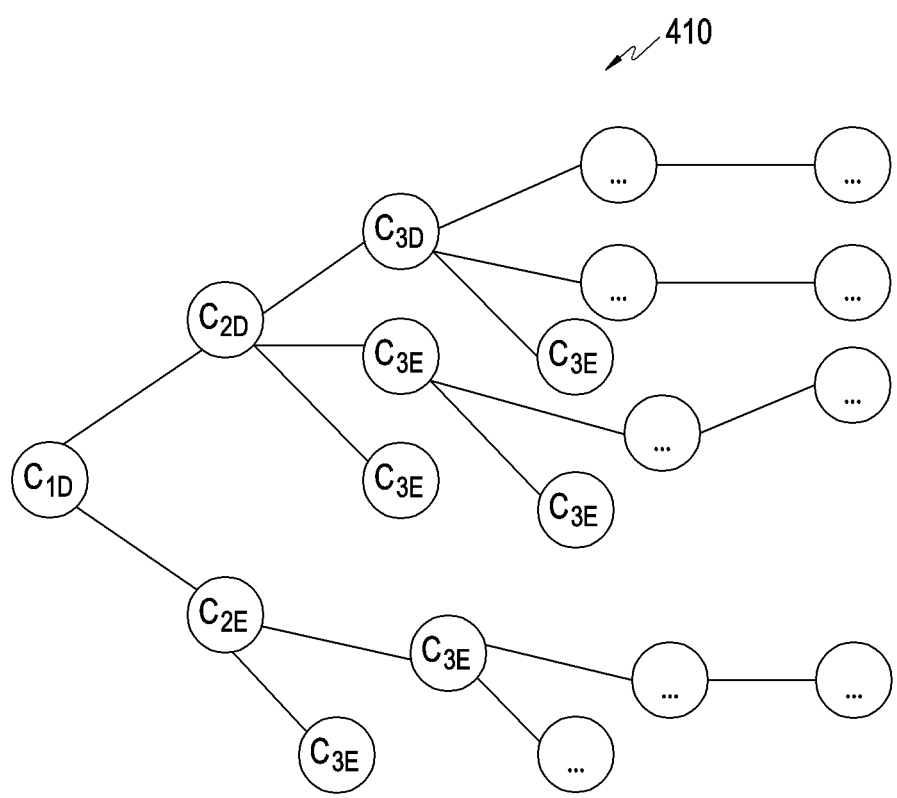
FIG. 4B shows a representation of computation time as tree, according to an embodiment of the disclosure.

FIG. 4B shows a representation of computation time as tree, according to an embodiment of the disclosure.

In an embodiment, yet another approach to find an optimal splitting point in a deep learning model with N layers 410 is considered. Initially IoT device chooses the nearest neighbor edge based on path-loss model to execute K optimal split computing points among IoT and edge to compute the total inference time ($I_{total}$) which is expressed by:

$$I_{Total} = \text{ArgMin}[I_D + t_K + I_E], k \in \{1, 2, \ldots, N\} \quad \text{Equation 11}$$

where $I_D$ is the inference time on IoT device to compute $I_D = C_{D1} + C_{D2} + \ldots + C_{DK}$, where $C_{Di}$ is the execution time of $i^{th}$ layer on the IoT device. Similarly, $I_E$ is the inference time on edge to compute $I_E = C_{EK+1} + \ldots + C_{EN}$, where $C_{Ei}$ is the execution time of $i^{th}$ layer on the edge.

Finally, $t_K$ is expressed as the transport time from IoT device to edge. A machine learning (ML) model is trained to find the correlation between transport time and total inference time. Using a regression model, an equation to get total inference time as a function of transport time is identified. Feedback of the external ML model is input to the IoT device or ML model is incorporated in the IoT device. Since transport time will depend on the output size, given that network is consistent, the total inference time for each layer is identified just from output size of that layer. The value of K at which the total inference time is minimum will be the optimal splitting point. Once the optimal K is determined, the model layers are split amongst IoT device and edge device.

In an embodiment, yet another approach to find an optimal splitting point for a deep learning model with N layers is considered. Initially, the IoT device chooses the nearest neighbor edge based on path-loss model to execute K optimal split computing points among IoT and edge to compute the total inference time ($I_{total}$) which is expressed by:

$$I_{Total} = \text{ArgMin}[I_D + t_K + I_E], k \in \{1, 2, \ldots, N\} \quad \text{Equation 12}$$

where $I_D$ is the inference time on IoT device to compute $I_D = C_{D1} + C_{D2} + \ldots + C_{DK}$ where $C_{Di}$ is the execution time of $i^{th}$ layer on the IoT device. Similarly, $I_E$ is the inference time on edge to compute $I_E = C_{EK+1} + \ldots + C_{EN}$, where $C_{Ei}$ is the execution time of $i^{th}$ layer on the edge.

Finally, $t_K$ is expressed as the transport time from IoT device to edge. A ML model is trained to find the correlation between transport time and total inference time. Using a long short-term memory (LSTM) model, the correlation prediction is performed. Feedback of the external LSTM model is input to the IoT device or LSTM model is incorporated in the IoT device. The transport time will depend on the output size given that network is consistent. The total inference time for each layer may be determined just from output size of that layer. The value of K at which the total inference time is minimum will be the optimal splitting point. Once the optimal K is determined, the model layers are split amongst IoT and Edge device.

Figure 5A:
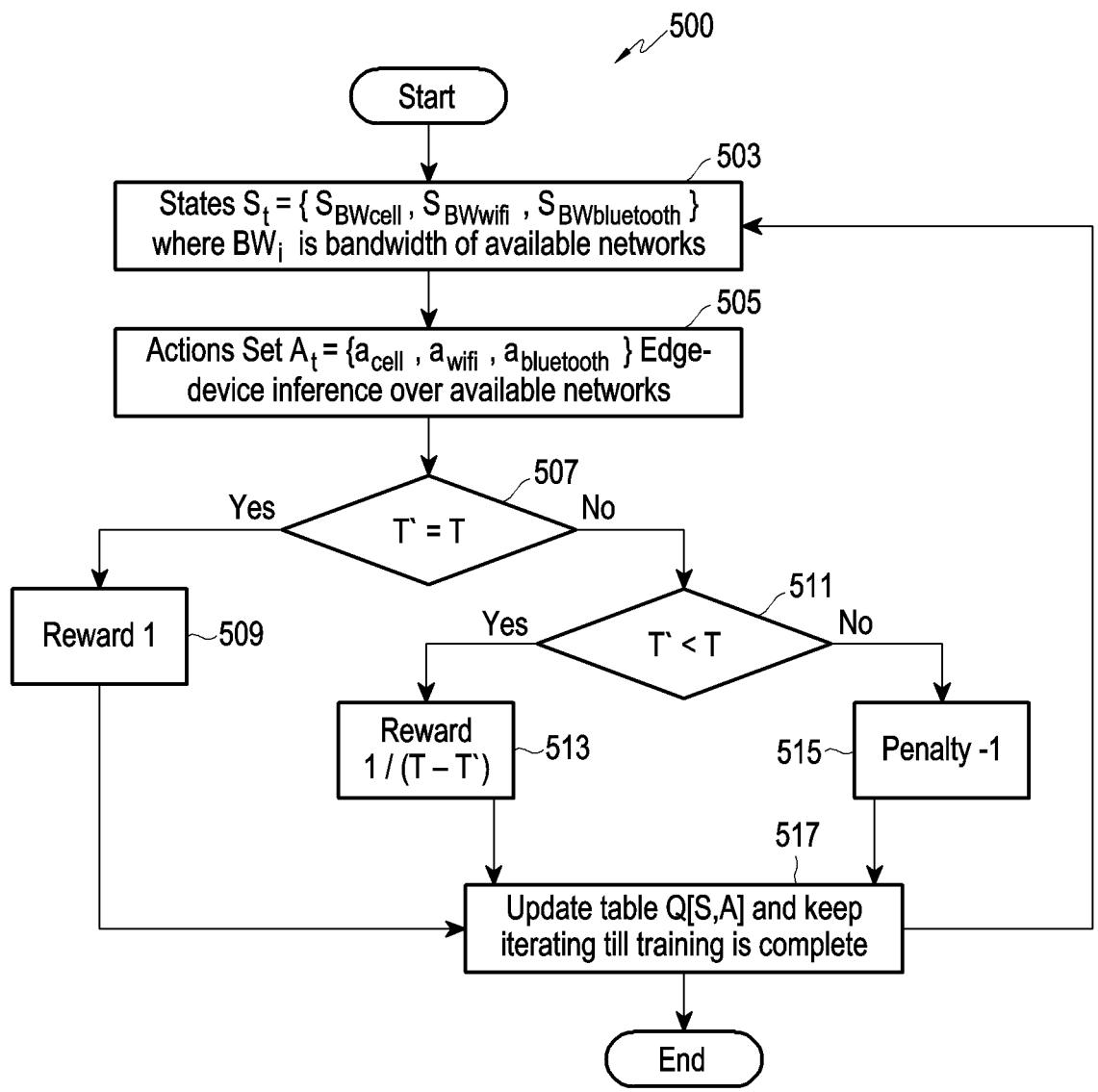
FIG. 5A shows a flowchart illustrating a method of learning-based reliable communication network switching according to an embodiment of the disclosure.

FIG. 5A shows a flowchart illustrating a method 500 of learning based Reliable Communication Network Switching according to an embodiment of the disclosure.

Referring to FIG. 5A, the learning based reliable communication network switching (L-RCNS) mechanism uses Q-learning (i.e., Reinforcement learning) based neural network inference framework for IoT-edge device communication. The IoT device optimally takes decision whether to choose cellular/Wi-Fi/Bluetooth to connect to edge device based on available bandwidth using L-RCNS mechanism. In L-RCNS methodology, IoT devices are considered as an agent. The agent interacts with the edge to take necessary actions, bandwidth measurements and reward functions. In operation 503, the state is defined as:

$$S_t = \{S_{BWcell}, S_{BWwifi}, S_{BWbluetooth}\} \quad \text{Equation 13}$$

where $BW_{cell}$, $BW_{wifi}$ and $BW_{bluetooth}$ are the bandwidth available for cellular, Wi-Fi and Bluetooth connectivity, respectively at each (epoch) time interval t. In operation 505, the IoT device takes action A to decide whether to transmit data through cellular, Wi-Fi or Bluetooth at each decision epoch time t such that:

$$A_t = \{a_{cell}, a_{wifi}, a_{bluetooth}\} \quad \text{Equation 14}$$

where $a_{cell}$, $a_{wifi}$, $a_{bluetooth}$ are the actions taken to switch the network either to cellular, Wi-Fi and Bluetooth, respectively. The goal is to find an optimal policy ($\pi^*$) such that an action A is considered at every state S to perform Q-learning not only at every epoch time t, but also to process the action with minimum time durations.

At every epoch, the agent chooses an action $a_t$ such that $a_t \subseteq A$. The agent provides reward $r_t$ based on the collected new bandwidth measurements $x_{t+1}$ for cellular, Wi-Fi and Bluetooth, respectively. Thus, the sequence of action and measured bandwidth for the state at t is given as: $S_t = \{x_1, a_1, x_2, a_2, \ldots, x_{t-1}, a_{t-1}, x_t, a_t\}$ are processed for learning the state variable S. This agent interacts with the edge to maximize the future reward by providing a discount factor $\gamma$ where $0 \leq \gamma \leq 1$. Maximize the expected discount factor at time t for $\pi^*: S \to A$ given by:

$$R_t = \sum_{t^*=t}^{\tau} \gamma^{t^* - t_r} t^* \quad \text{Equation 15}$$

where $\tau$ is the timestamp at which IoT-edge communication decides to terminate. Further the reward ($R_t$) is analyzed in terms of DNN inference time using DSC mechanism as:

$$\text{Reward}(R_t) = \begin{cases} \text{If } T' < T, \text{ then } R_t = \dfrac{1}{(T - T')} \\ \text{else } T' == T, \text{ then } R_t = 1 \\ \text{else } T' > T, \text{ then } R_t = -1 \end{cases} \quad \text{Equation 16}$$

where T is the time taken, if the DNN inference is computed on-device and T' is the time taken, if the DNN inference is computed using DSC mechanism.

Using Q-learning (i.e., reinforcement learning) model, suitable network is selected and perform DL inference using DSC mechanism. If the Q-learning model selects a network that performs inference using DSC mechanism and T'≤T, then a positive reward is given to the Q-learning agent; otherwise, a negative reward is given to the agent that train the model to choose the best network for split-computing. In Q-learning model, giving reward is a way to tell the agent that the action is taken at a particular state which may be successful or unsuccessful to achieve the desired goal. In our case, if the agent performs inference in less than the on-device time, then give a positive reward based on the difference in T and T', which means that the agent made a good decision in choosing the network. If the agent may not perform inference in less than on-device time, then provide a negative reward i.e., −1; which means that the agent made a bad decision in choosing the network; so next time, it should not select the same network at the same state. Further, to determine an optimal policy ($\pi^*$), define an optimal action value function $Q^*(s, a)$ which take some action 'a' for the state 's' such that:

$$Q^*(s, a) = \max_{\pi^*_{\{cell, wifi, blue\}}} E[R_t \mid S_t = s, a_t = a, \pi^*] \quad \text{Equation 17}$$

where $\pi^*$ is the policy mapping sequences to choose an action to latch either cellular, Wi-Fi or Bluetooth, respectively. The IoT device maintains a table of Q* [S, A] where S is the set of states for S and A is the set of actions for a. The Q(s, a) represents the current estimate of Q*(s, a) for the cumulative reward r expected by performing an action 'a' in state the s given by:

$$Q^*(s, a) = \arg\max_{a_{\{cell, wifi, blue\}}} Q^*(s, a); \pi^*:S \to A \quad \text{Equation 18}$$

Over several iterations, the IoT device performs different actions at different states and updates the Q*(S, A) table. Finally, it is able to generate the optimal policy ($\pi^*$) while maximizing the action to obtain the values of Q*(s, a) given by:

$$Q^*(s, a) = E\left[r + \gamma \max_{a_{\{cell, wifi, blue\}}} Q^*(s^*, a^*) \mid s, a\right]; \pi^*:S \to A \quad \text{Equation 19}$$

where s* is the updated state derived for the action 'a' for the state 's'.

An example of the above method 500 is explained with reference to FIG. 5A. In operation 503, the state is set based on, for example, Equation 13. In operation 505, the actions are set based on, for example, Equation 14. In operation 507, it is determined whether T'=T. When it is determined that T' is equal to T in operation 507, a positive reward is given in operation 509. When it is determined that T' does not equal T in operation 507, it is determined whether T' is less than T in operation 511. When it is determined that T' is less than T in operation 511, a reward of 1/(T−T') is given in operation 513. When it is determined that T' is not less than T in operation 511, a penalty is given in operation 515. After operation 509, 513, or 515, table Q[S,A] is updated in operation 517. If training is not complete in operation 517, the method returns to operation 503 to for a new iteration. Otherwise, if training is complete in operation 517, the method 500 ends.

Figure 5B:
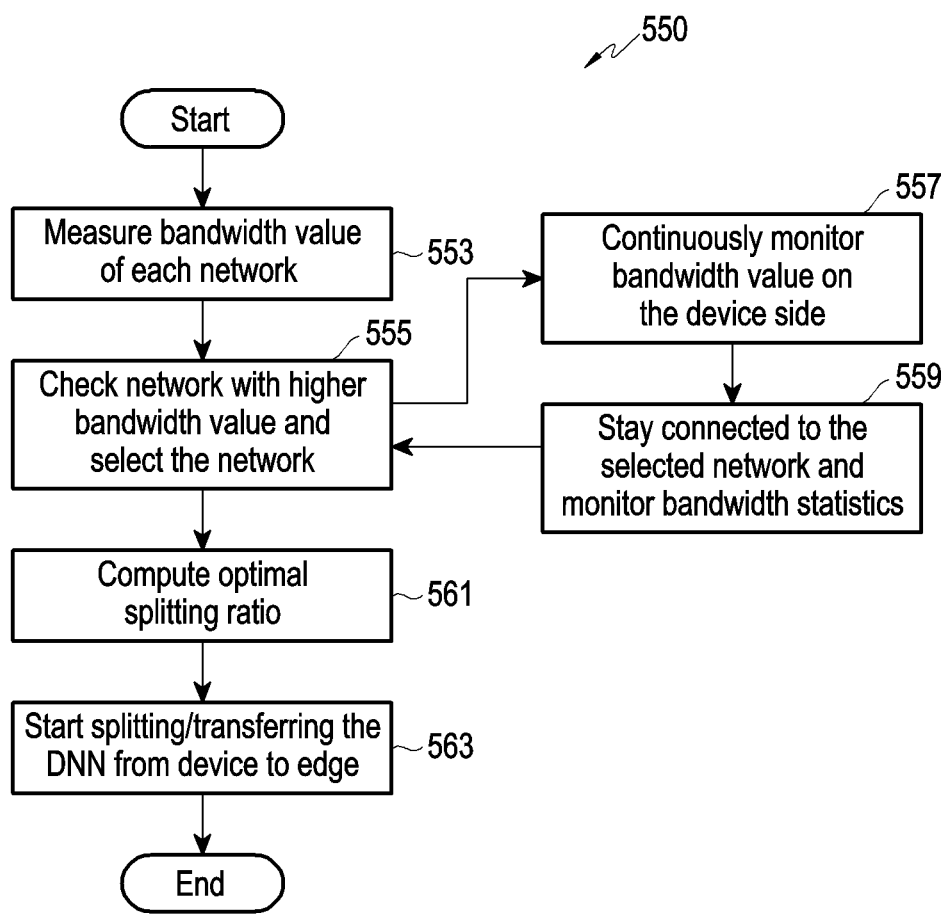
FIG. 5B shows a flowchart illustrating a method of rule-based reliable communication network switching, according to an embodiment of the disclosure.

FIG. 5B shows a flowchart illustrating a method 550 of rule based Reliable Communication Network Switching, according to an embodiment of the disclosure.

Referring to FIG. 5B, the IoT device collects bandwidth measurements for cellular, Wi-Fi and Bluetooth for each time duration T. Based on the collected bandwidth measurements, the IoT device continues to check with the network with higher bandwidth value to establish a communication with the edge device. Once the suitable network is selected, the DNN inference task is partitioned among IoT and edge device, respectively. Based on the partitioned DNN inference, an optimal splitting ratio is determined as described in DSC mechanism. The selected network bandwidth measurements value is considered as $B_{Wi} \in \{cell, Wi\text{-}Fi, Bluetooth\}$ where cell, Wi-Fi and Bluetooth are the bandwidth measurements of cellular, Wi-Fi and Bluetooth network, respectively. Simultaneously, the IoT device checks the bandwidth statistics of another available network. The network with higher bandwidth measurements value is selected to the next network. During the selected network, the IoT device applies rule-based policy to map with the bandwidth measurements value ($B_{Wi}$) w.r.t the split computing point.

An example of the above method 550 is explained with reference to FIG. 5B. In operation 553, a bandwidth value of each network is measured. In operation 555, a network with a higher bandwidth value is checked and the network is selected. In operation 557, the bandwidth value on the device side is continuously monitored. In operation 559, the connection to the selected network is maintained, bandwidth statistics continue to be monitored, and then the method returns to operation 555. In operation 561, optimal splitting ratio is computed. In operation 563, splitting is started based on the optimal splitting ratio and a splitted part of the DNN is transferred from the IoT device to the edge device, and thereafter the method 550 ends.

FIGS. 6A, 6B, and 6C illustrate an end-to-end architecture of fitness application based on extended dynamic split computation (E-DSC) algorithm, according to various embodiments of the disclosure.

Referring to FIGS. 6A to 6C, in the example the objective is to detect whether the person is performing squats using service correctly or not (i.e., fitness poses estimation/detection). In an embodiment, this is done by running Pose Net model inference, getting position of skeletal joints in frame. For squat, angle formed between hip-joint, knee joint and ankle-joint of both legs should be >=40 deg and <=120 deg.

In an embodiment, to implement fitness application usecase among IoT device and edge device, an E-DSC algorithm is proposed, which may find an optimal splitting point of PoseNet (considered as a DNN model). The E-DSC algorithm is an advanced end-to-end framework of Dynamic Split Computation model. The algorithm partitions PoseNet model into two parts based on available current network throughput of Wi-Fi network. One inference part is executed in IoT device, and the other inference part is executed by edge device to minimize the execution time of the model. In the concept of edge computing the heavy computation tasks are offloaded to powerful edge nodes.

The computation may happen in two modes, namely, a remote mode and a partial split mode. The remote mode involves offloading the entire computation to the edge devices. Whereas in the partial split mode, the task is partitioned between the IoT device, and the edge device based on the computation power of the edge and the available network throughput. The E-DSC algorithm is used to find an optimal split of PoseNet DNN model to minimize the execution time of the model. The algorithm calculates the split-ratio based on computation power of the IoT device and of the edge and the available network throughput.

FIGS. 6A and 6B show the end-to-end architecture of fitness application which detects if the person is performing squats correctly or not and displays the count. PoseNet is used here to perform human pose estimation which is a computer vision technique to identify poses in a video. A camera module 609 in the IoT device 603 captures live video frames of the person 601 performing the exercise. The frames have size 320×240×3, i.e., that are of quarter video graphics array (QVGA) quality. The frames are passed to a video scaling module 611 and tensor conversion module 613 implemented using NNStreamer framework. Video scaling module 611 resizes video frames to match the input dimensions of the PoseNet model. The video scaling module 611 may support a wide range of color spaces such as red green blue (RGB), YUV (y), Blue-luminance (u), Red-luminance (v) (SECAM and Pal Color Spaces) Computer Hardware) Luminance and 1420, etc.

In tensor conversion module 613, the video data is converted to tensor format. The tensor data is provided to the device-side PoseNet model to do partial inference. Here, the tensor data is provided to a device side NN interface 615, which is then provided to the gRPC client 617. A gRPC connection is created between the gRPC client 617 of the IoT device 603 and a gRPC server 619 of the edge device 605 to exchange the models and the NNStreamer pipeline 607 configuration. The IoT device 605 sends the result 621 of partial inference to the edge device 605. The edge device 605 executes the remaining PoseNet model inference and sends the result 615 back. The gRPC server 619 sends the data 621 received from the IoT device 603 to tensor conversion module 613, which is then sent to edge side NN interface 623. The edge side NN interface 623 sends the results to the gRPC server 619, which is then send to the gRPC client 617. The IOT device 603 receives the output of complete PoseNet inference. The output consists of the co-ordinates of 17 key-points or joints of the human body in the frame. By finding the angle between these key points, the human pose is estimated by interpterion results module 629, and then by a pose is squat determiner module 631. If the pose is a correct squat (633), then the estimator increments the count and displays the count on a display 635.

Referring to FIG. 6C, an example of a method of the end-to-end architecture of fitness application shown is FIGS. 6A and 6B is described. In operation 640, the camera module 609 of the IoT device 603 captures live video frames of the person 601 performing the exercise. In operation 642, the video scaling module 611 of the IoT device 603 performs video scaling. In operation 644, the video scaling module 611 of the IoT device 603 performs a scaling of frames. In operation 646, the tensor conversion module 613 of the IoT device 603 performs tensor conversion. In operation 648, the tensor conversion module 613 of the IoT device 603 performs a tensor transform. In operation 650, the tensor conversion module 613 of the IoT device 603 outputs the tensor data. In operation 652, it is determined whether the IoT device 603 is connected to the edge device 605. If it is determined that the IoT device 603 is connected to the edge device 605 in operation 652, partial on-device inference is performed by the IoT device 603 in operation 654. In operation 656, results 621 are sent from gRPC client 617 of the IoT device 603 to the edge device 605. In operation 658, tensor conversion is performed by the tensor conversion module 613 of the edge device 605. In operation 660, the remaining inference is performed by the edge device 605. In operation 662, the gRPC server 619 of the edge device 605 sends the result 615 to the IoT device 603. In operation 663, the IoT device 603 performs tensor conversion, and the method proceeds to operation 664. Otherwise, if it is determined that the IoT device 603 is not connected to the edge device 605 in operation 652, on device inference is completed in operation 662, and the method proceeds to operation 664. In operation 664, body key points are detected. In operation 666, it is determined whether the pose is a squat. If the pose is determined as a squat in operation 666, then in operation 668 a squat count is increased.

FIGS. 7A, 7B, 7C, 7D, 7E, and 7F show flow diagrams illustrating a method of setting up suitable network connectivity and split computing inference time, according to various embodiments of the disclosure.

Referring to FIGS. 7A to 7F, to validate the proposed DSC algorithm, experiments were performed in a real environment. The Raspberry Pi (R-Pi) is considered as an IoT device and Samsung Galaxy S20 smartphone as an edge device deployed in an indoor scenario. The R-Pi device is equipped with a Broadcom BCM2711, Quad core Cortex-A72 (ARM v8), 64-bit system on a chip (SoC) and 2 GB random access memory (RAM). The Samsung Galaxy S20 smartphone consists of Qualcomm SM8250 Snapdragon 865 (7 nm+) SoC with octa-core CPU and a memory of 8 GB RAM. Therefore, the RPI (i.e., an IoT device) is a low computation device as compared to the Samsung Galaxy S20 smartphone (i.e., an edge device) considered in our deployment scenario to validate the DSC algorithm.

Further to validate L-RCNS and R-RCNS models respectively, throughput (i.e., bandwidth) values of cellular, Wi-Fi and Bluetooth dataset is collected using Samsung Galaxy S20 smartphone at discrete interval of time in an indoor environment. To test the DNN models for split computing among IoT-edge platform, two neural network models are considered: MobileNet and PoseNet. MobileNet is a class of convolutional neural networks (CNN) model open-sourced by Google which is used for vision applications in mobile devices. Similarly, PoseNet is also a CNN model that is used for real-time human pose estimation. The DNN models are benchmarked (both MobileNet and PoseNet) using the TensorFlow benchmark tool. For each model, a single thread is used to perform benchmarking on both RPi device and S20 device.

Figure 7A:
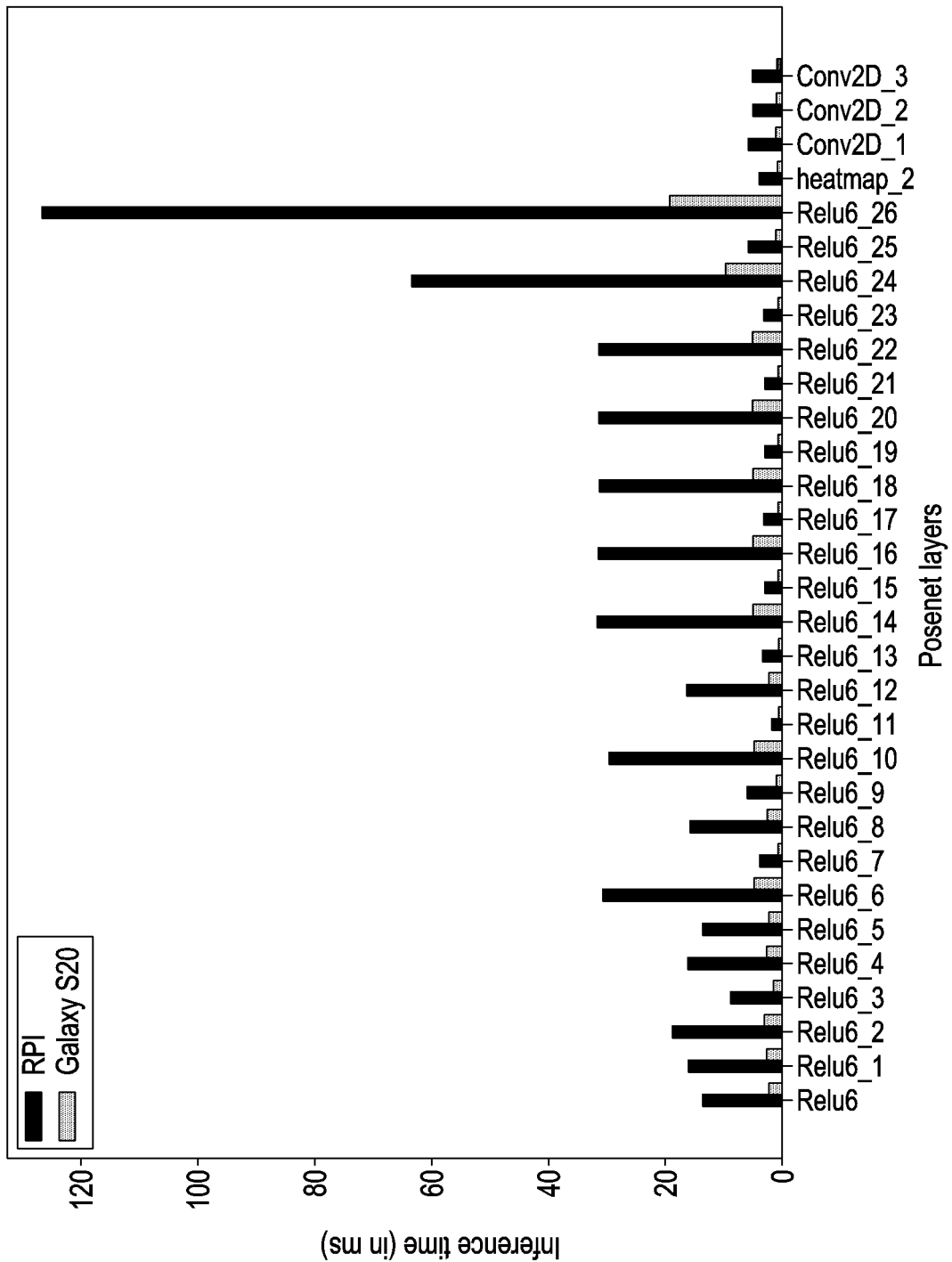
Figure 7B:
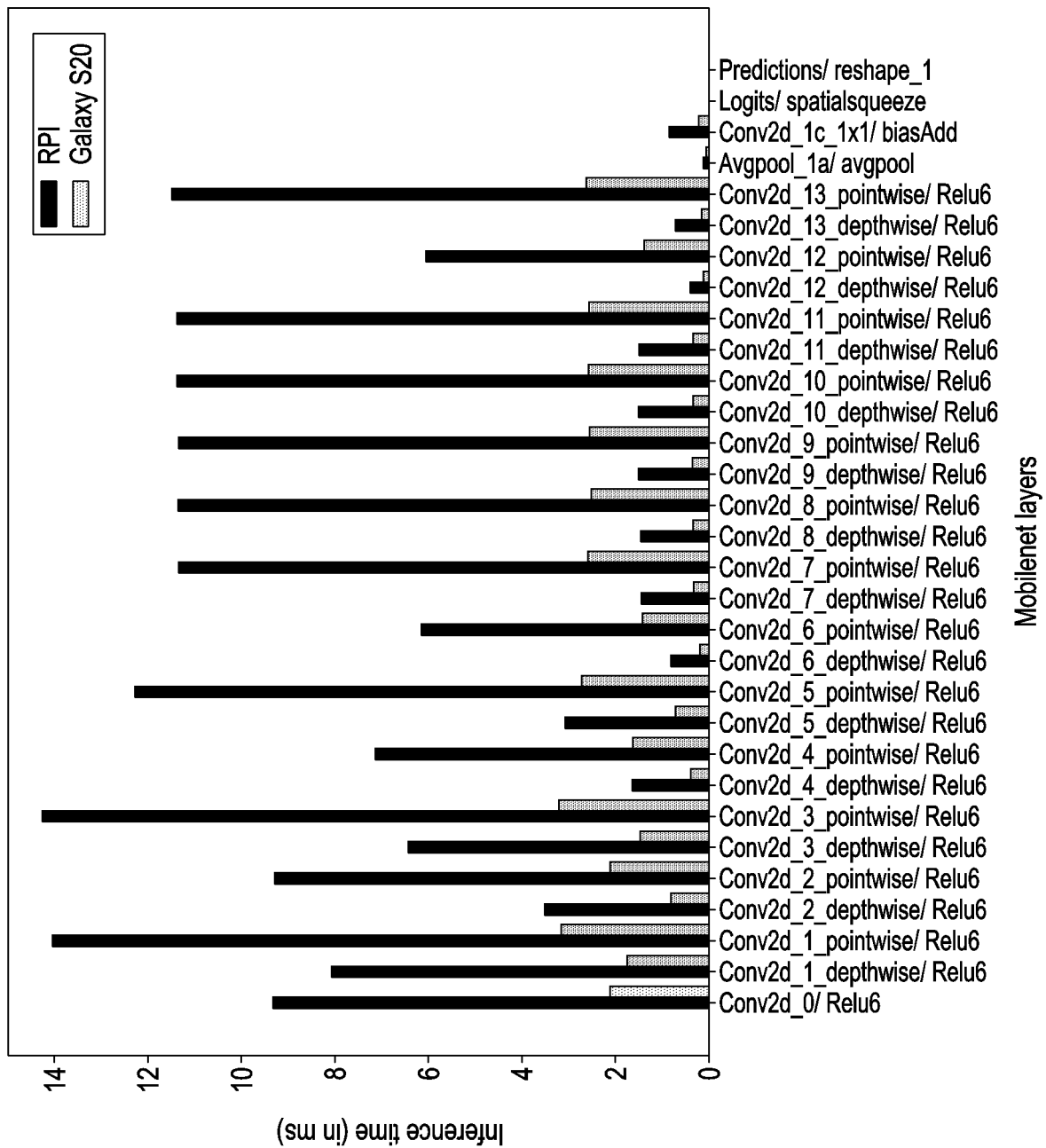
Figure 7C:
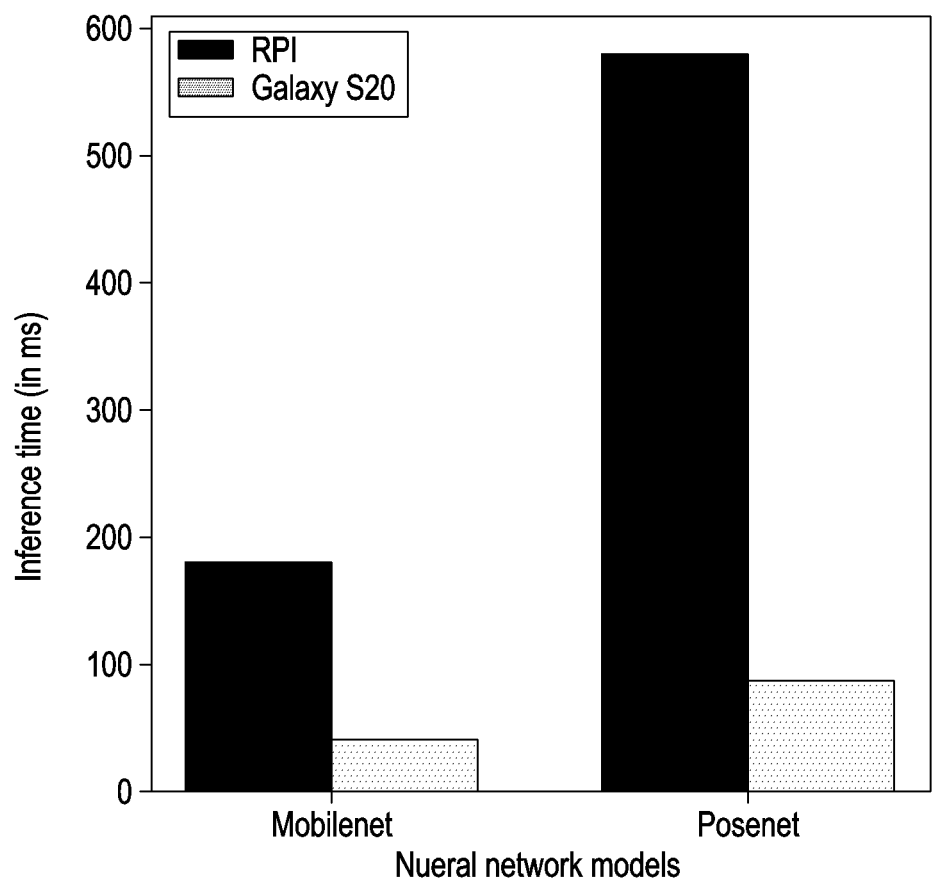

Referring to FIG. 7C, the time taken by the inference execution of both MobileNet and PoseNet models are shown which are implemented on RPI device and Galaxy S20 device. The result depicts that the MobileNet model takes approximately 75% lesser time to execute on a given smartphone (for example, Galaxy S20 device) than on R-Pi device; whereas the PoseNet model takes approximately 84% lesser time on Galaxy S20 device. This is because, Galaxy S20 device consists of much more computationally powerful processor to perform the DNN task than the RPI device. In FIG. 7A, the inference time (in ms) for execution of each layer of PoseNet model is shown which is implemented on both RPI device and Galaxy S20 device.

Similarly, the FIG. 7B depicts the inference time for execution for each layer of MobileNet. In both FIGS. 7A and 7B, the result depicts that DNN model takes lesser execution time for each inference layer on Galaxy S20 device than on RPI device. Based on the inference time taken for each layer in DNN model as shown in FIGS. 7A and 7B, a trade-off between computational resource and network reliability to compute execution time on-device and execution time on edge to get the optimal point for splitting the computation using DSC algorithm. The experiment involves performing the inference of DNN models using DSC algorithm to split the inference computation between the R-Pi device and the Galaxy phone. For each model, 10 epochs of 14 iterations each are performed. Each iteration involves a round of execution of model inference. In every iteration, RCNS mechanism compute the throughput of the available networks (i.e., Cellular, Wi-Fi and Bluetooth).

Figure 7D:
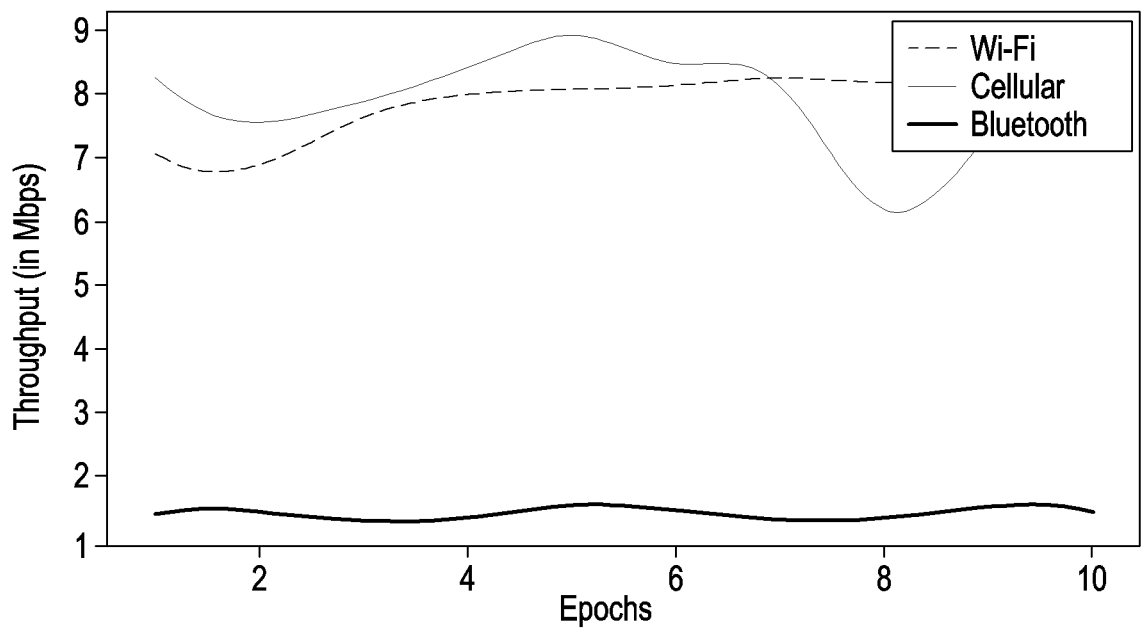
Figure 7E:
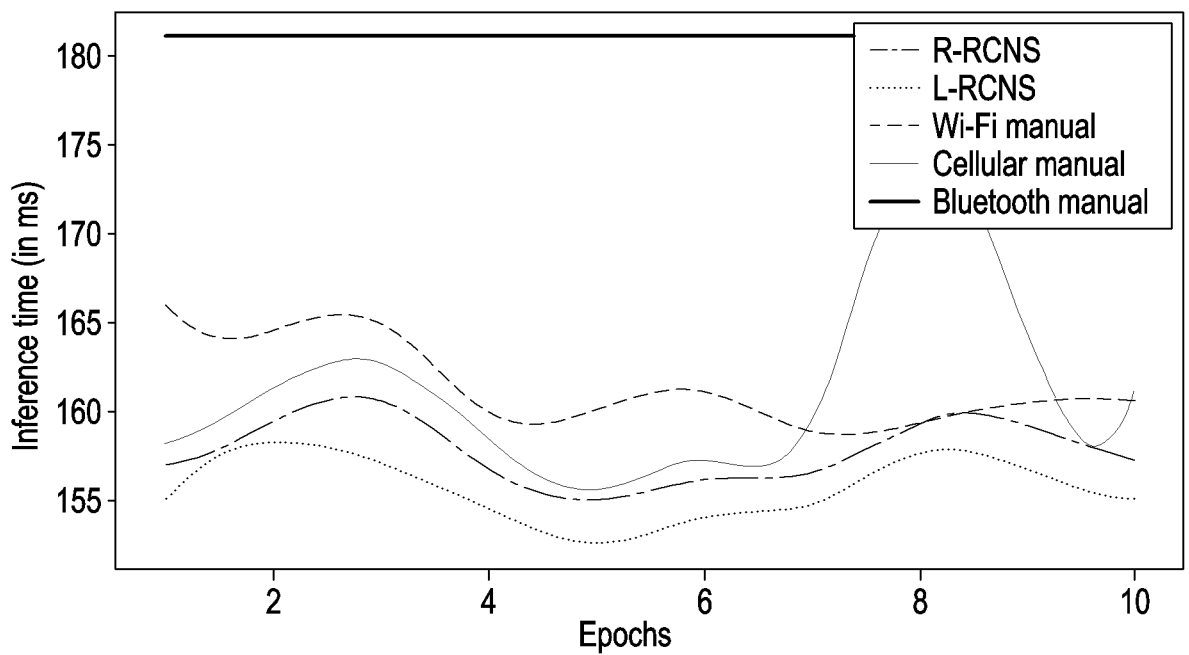

The FIG. 7D shows the variations of average throughput in each epoch. Then the algorithm switches to the most suitable network and partitions the DNN model into two sub-parts (i.e., IoT-side DNN model and edge-side DNN model). A pipeline is created between the IoT and the edge with the selected network and the model inference is performed. The time taken to perform inference of the model with the created pipeline is recorded for each iteration. The FIG. 7E shows the inference time for MobileNet using R-RCNS and L-RCNS models, respectively compared to the Cellular/Wi-Fi/Bluetooth manual network setting. The Cellular/Wi-Fi/Bluetooth manual setting is used when the Cellular/Wi-Fi/Bluetooth network is considered for data transmission without considering the switching to any other networks.

The FIG. 7E depicts that the L-RCNS achieves minimum inference time which is 14.1% lesser than the time taken for on-device inference and 1.4% lesser than R-RCNS. The observation tells that R-RCNS takes 12.8% lesser time than for on-device inference and further performs 3.7% and 2.2% improvement than Cellular manual and Wi-Fi manual, respectively. Both Wi-Fi manual and Cellular manual provides better performance than on-device inference due to the higher bandwidth and higher processing power of galaxy S20 device. The RCNS algorithm selects on-device inference over edge-based inference while using Bluetooth.

Figure 7F:
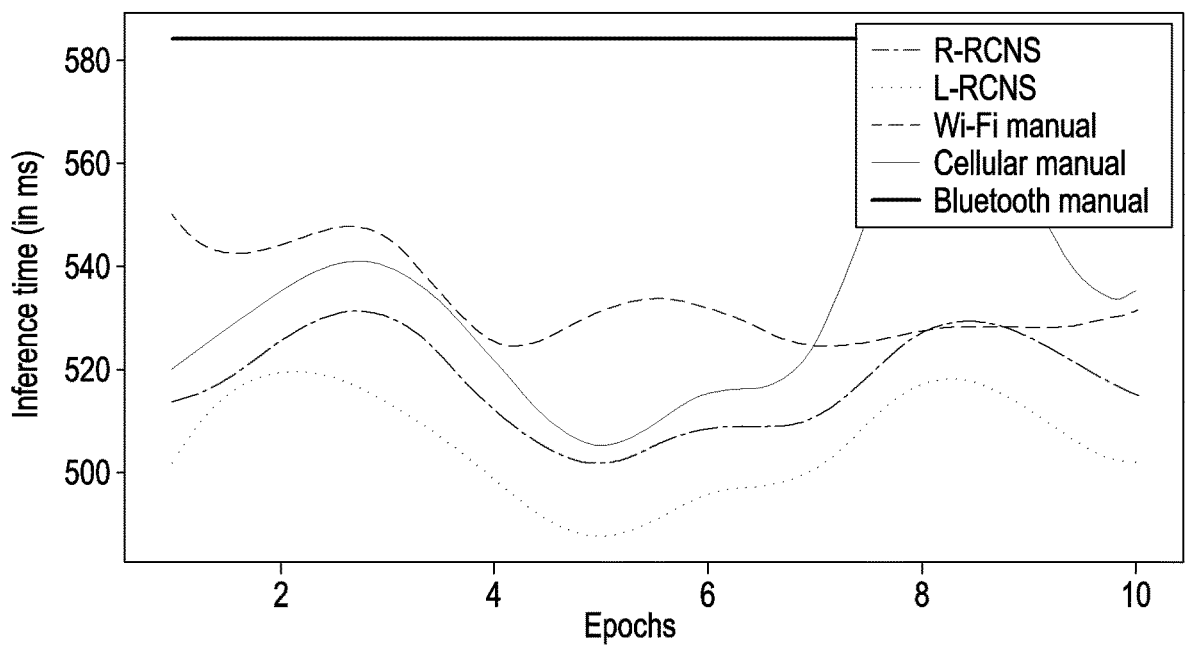

The FIG. 7F compares the performance of PoseNet model. The result depicts that L-RCNS provides the best performance with the minimum inference time which is 13.5% lesser than on-device and 2.3% lesser than R-RCNS. R-RCNS performs 5.4%, 3.0%, and 11.3% better than Cellular manual, Wi-Fi manual, and on-device, respectively. Cellular manual and Wi-Fi manual complete the inferences in lesser time than the on-device, whereas the RCNS selects on-device over edge-based inference using Bluetooth. Therefore, from both FIGS. 7E and 7F, the L-RCNS provides better performance (i.e., lesser inference time) compared to R-RCNS, Cellular/Wi-Fi/Bluetooth manual models with higher network bandwidth.

The Table 4 shows the real time results for the execution of MobileNet inference model done on RPi and Galaxy S20 device using Wi-Fi hotspot settings to validate DSC. As shown in the table, for throughput less than 6 Mbps, the model decides to execute MobileNet completely on-device and hence, the average inference time is same as the average on-device execution time. For throughput higher than 6 Mbps but less than 11 Mbps, the MobileNet DNN layers 1-11 are executed on-device and the layers 12-31 on-edge. There is a reduction in inference time from the on-device inference time. If the throughput is even higher than 11 Mbps, then complete on-edge execution is done and the inference time of the model is highly reduced.

TABLE 4

| Throughput Range | Split point | Inference time (compute on-device + transport + compute on-edge) |
| --- | --- | --- |
| Less than 6 Mbps | Complete on-device execution | 181 ms |
| Greater than 6 Mbps and less than 11 Mbps | Layers 1-11 -> on-device Layers 12-31 -> on-edge | Less than 181 ms and greater than 145 ms |
| Greater than 11 Mbps | Complete on-edge execution | Less than 145 ms |

The Table 5 shows that for throughput less than 3 Mbps, complete on-device execution of PoseNet is preferred. With throughput higher than 3 Mbps but less than 7 Mbps, the layers 1-28 are executed on-device and the remaining layers on-edge. For even higher throughput values lesser than 25 Mbps, the split point obtained is the layer 12 i.e., the edge should be used for inference of layers after layer-12. The use of split-point obtained from the model provides a reduced inference time. In the case of very high throughput i.e., greater than 25 Mbps, the model is executed completely on-edge with a highly decreased inference time.

TABLE 5

| Throughput Range | Split point | Inference time (compute on-device + transport + compute on-edge) |
| --- | --- | --- |
| Less than 3 Mbps | Complete on-device execution | 584 ms |
| Greater than 3 Mbps and less than 71 Mbps | Layers 1-28 -> on-device Layers 29-31 -> on-edge | Less than 584 ms and greater than 560 ms |
| Greater than 11 Mbps and less than 25 Mbps | Layers 1-12 -> on-device Layers 13-31 -> on-edge | Less than 560 ms and greater than 330 ms |
| Greater than 25 Mbps | Complete on-edge execution | Less than 330 ms |

From the Table 4 and the Table 5, it is observed that for low throughput values, the majority of the inference happens on-device and only a small portion is offloaded to the edge. In such scenarios, the inference time is quite high and close to the on-device execution time. As the throughput increases, the model decides to execute the majority of the inference on-edge due to which the inference time reduces greatly. Complete on-edge inference is the preferred option for very high throughput values.

Thus, in the disclosure, DNN model is partitioned among IoT-edge devices based on an optimal split point using DSC algorithm. The DSC algorithm is validated in a real time experimental set-up using RPI device and Galaxy S20 device which reduces the computational overhead. Further, the proposed L-RCNS model provides a better reliable connectivity and provide lesser inference time than R-RCNS and Cellular/Wi-Fi/Bluetooth manual models in the IoT-edge platform. The L-RCNS is able to learn the network by choosing a suitable network (i.e., cellular/Wi-Fi/Bluetooth) compared to R-RCNS and Cellular/Wi-Fi/Bluetooth manual models to provide higher network bandwidth.

FIG. 8 illustrates a comparison of inference time computed on device, on edge and split-inference based on throughput, according to an embodiment of the disclosure.

Referring to FIG. 8, an experiment is performed by considering Raspberry Pi (RPi) as an IoT device and Samsung Galaxy smartphone (i.e., Galaxy S20 device) as a home edge device. The RPi device uses a Broadcom BCM2711 which is a Quad core Cortex-A72 (ARM v8) based processor and 2 GB random access memory (RAM). The Galaxy S20 phone is powered by Qualcomm SM8250 Snapdragon 865 (7 nm+) SoC with octa-core CPU and 8 GB RAM. The Galaxy S20 device has higher computation power as compared to RPi device. A Wi-Fi hotspot network is considered between RPi and S20 to establish a connectivity. To test E-DSC algorithm, in both RPi & S20 device, benchmark the PoseNet model with execution over four threads.

---

Algorithm 1 Extended Dynamic Split Computation (E-DSC)

Input: $L_1, L_2, L_3, \ldots, L_N$ layers of DNN model where N = 31 for PoseNet; $C_D = \{c_{D_1}, c_{D_2}, c_{D_3}, \ldots, c_{D_N}\}$: a set of computation time where $c_{D_i}$ is the execution time of $i_{th}$ layer on device; $C_E = \{c_{E_1}, c_{E_2}, c_{E_3}, \ldots, c_{E_N}\}$: a set of computation time where $c_{E_i}$ is

| Algorithm 1 Extended Dynamic Split Computation (E-DSC) |
|---|
| the execution time of $i_{th}$ layer on edge; S = {$S_1, S_2, S_3, \ldots, S_N$}: a set of the size of output of each layer; InputSize: size of the input of the model; TH: estimated current network throughput. |
| Output: |
| 1:    splitPoint: optimal split-point |
| 2:    minInferenceTime: minimum inference time obtained |
| 3:    $InputTransportTime = \dfrac{InputSize}{TH}$ |
| 4:    $I_D = c_{D_1} + c_{D_2} + \ldots + c_{D_N}$ and $I_E = c_{E_1} + c_{E_2} + \ldots + c_{E_N}$ |
| 5:    If $I_D \leq$ InputTransportTime + $I_E$ then |
| 6:       splitPoint = on-device inference |
| 7:       minInferenceTime = $I_D$ |
| 8:    else |
| 9:       splitPoint = on-edge inference |
| 10:      minInferenceTime = InputTransportTime + $I_E$ |
| 11:   for each layer $\in$ {1, 2, \ldots, N − 1} do |
| 12:      $I_D = c_{D_1} + c_{D_2} + \ldots + c_{D_{layer}}$ |
| 13:      $I_E = c_{E_{layer+1}} + c_{E_{layer+2}} + \ldots + c_{E_N}$ |
| 14:      $transportTime = \dfrac{S_{layer}}{TH}$ |
| 15:      if $I_D$ + transportTime + $I_E$ < minInferenceTime then |
| 16:         splitPoint = layer |
| 17:         minInferenceTime = $I_D$ + transportTime + $I_E$ |
| 18:   end |
| 19:   return splitPoint |

Based on the benchmarking, the inference time of each layer of PoseNet on RPi and S20 is determined. This is used by the E-DSC to decide the optimal split point of the model. The Table 6 shows various split-points of PoseNet model computed using E-DSC algorithm for different values of network Wi-Fi throughput. The NNStreamer is used to create a pipeline between RPi and S20 device integrated with realtime transport (RTP) as an underlying protocol. The Table 6 shows that for Wi-Fi throughput less than 4 Mbps, the algorithm selects complete on-device inference of the PoseNet model and the average inference time is 445 ms. In this case, since the network throughput is poor, it is preferable not to offload the inference layers from RPi to Galaxy S20 device and 100% execution happens on-device.

TABLE 6

| Throughput Range (TH) | Split point | Inference Time (IT) |
|---|---|---|
| TH <= 4 Mbps | Complete on-device execution | $I_T$ = 445 ms |
| 4 Mbps < TH <= 8 Mbps | Layers 1-28 (on-device) and Layer 29-31 (on-edge) | 425 ms < $I_T$ <= 445 ms |
| 8 Mbps < TH <= 31 Mbps | Layer 1-12 (on-device) and Layer 13-31 (on-edge) | 230 ms < $I_T$ <= 425 ms |
| TH > 31 Mbps | Complete on-edge execution | $I_T$ < 230 ms |

In an embodiment, with throughput higher than 4 Mbps but less than 8 Mbps, the layers 1-28 (approximately 90%) are executed on RPi and the remaining layers (approximately 10%) on Galaxy S20 device where the total inference time is in between 445 ms and 425 ms. With this split, the total inference time is considered as the summation of inference time executed on device, data transfer time and the inference time executed on edge. In this case, the Wi-Fi throughput is reasonable, so a 90:10 split is selected by the algorithm. For even higher throughput values but lesser than 31 Mbps, the split point obtained is the layer 12 i.e., the Galaxy S20 performs the PoseNet inference layers from layer 13-31 for which the total inference time is in between 425 ms and 230 ms. During this partitioning of layers, the Wi-Fi throughput is good (i.e., in-between 8 Mbps and 31 Mbps) with model partition (%) ratio of 39:61 (i.e., layers 1-12 computed on-device and layers 13-31 computed on edge).

Thus, the results show that the total inference time (compute on device+data transfer+compute on edge) with E-DSC algorithm is always less than the total inference time with on-device computation. In case of very high throughput (i.e., greater than 31 Mbps), the algorithm selects complete offload to Galaxy S20 device where the total inference time (i.e., data transfer+compute on edge) is less than 230 ms. Hence, the E-DSC algorithm may vary the DNN model partition based on the available network throughput. If the throughput is low, then the partition is done such that more DNN layers are executed on the device and less on the edge. If the throughput is higher, then the majority execution happens on the edge.

The FIG. 8, compares the inference time (in ms) of PoseNet model computed in three ways: on-device inference (i.e., completely on the RPi), on-edge inference (i.e., complete offload to the Galaxy S20 device) and split inference using the E-DSC algorithm over 500 iterations. FIG. 8 shows the variation in inference time w.r.t the iterations where an average Wi-Fi throughput of 12.6 Mbps is considered (with Wi-Fi throughput ranging from 7.2 Mbps to 13.3 Mbps). Further, FIG. 8 depicts that the average on-device inference time on the RPi is 445 ms, whereas the average on-edge inference time (which is the summation of the time taken to transfer data between the RPi and the S20 and the model execution time on the S20) is 535 ms. The split-inference using the E-DSC algorithm achieves an average inference time of 345 ms which comprises of the time taken by partial inference on the RPi, the time taken to transfer the data between the Rpi and the S20 and the time taken to perform the remaining inference on the S20. The E-DSC algorithm dynamically finds an optimal partition of the DNN model based on the network throughput and the inference time with E-DSC is always less than the execution time on-device and on-edge. This is essential in IoT applications with low latency constraints.

FIG. 9 illustrates a block diagram of a computer system 900 for implementing embodiments consistent according to an embodiment of the disclosure.

Referring to FIG. 9, the computer system 900 may be the Internet of Things (IoT) device 101 and/or an edge device 103 illustrated in FIG. 1, which may be suitably configured for execution of DNN in an IoT-edge network. The computer system 900 may include a central processing unit ("CPU" or "processor" or "memory controller") 902. The processor 902 may comprise at least one data processor for executing program components for executing user- or system-generated business processes. A user may include a network manager, a service provider, a user of the IoT device, a user of the edge device, an application developer, a programmer, an organization or any system/sub-system being operated parallelly to the computer system 900. The processor 902 may include specialized processing units such as integrated system (bus) controllers, memory controllers/memory management control units, floating point units, graphics processing units, digital signal processing units, etc.

The processor 902 may be disposed in communication with one or more Input/Output (I/O) devices (911 and 912) via I/O interface 901. The I/O interface 901 may employ communication protocols/methods such as, without limitation, audio, analog, digital, stereo, IEEE®-1394, serial bus, universal serial bus (USB), infrared, PS/2, BNC, coaxial, component, composite, digital visual interface (DVI), high-definition multimedia interface (HDMI), radio frequency (RF) antennas, S-Video, video graphics array (VGA), IEEE® 802.n/b/g/n/x, Bluetooth, cellular (e.g., code-division multiple access (CDMA), High-Speed Packet Access (HSPA+), global system For mobile communications (GSM), long-term evolution (LTE) or the like), etc. Using the I/O interface 901, the computer system 900 may communicate with one or more I/O devices 911 and 912.

In some embodiments, the processor 902 may be disposed in communication with a communication network 909 via a network interface 903. The network interface 903 may communicate with the communication network 909. The network interface 903 may employ connection protocols including, without limitation, direct connect, Ethernet (e.g., twisted pair 10/100/1000 Base T), transmission control protocol/internet protocol (TCP/IP), token ring, IEEE® 802.11a/b/g/n/x, etc.

In an implementation, the preferred network 105 may be implemented as one of the several types of networks, such as intranet or local area network (LAN) and such within the organization. The preferred network 105 may either be a dedicated network or a shared network, which represents an association of several types of networks that use a variety of protocols, for example, hypertext transfer protocol (HTTP), transmission control protocol/internet protocol (TCP/IP), wireless application protocol (WAP) etc., to communicate with each other. Further, the communication network 909 may include a variety of network devices, including routers, bridges, servers, computing devices, storage devices, etc.

In some embodiments, the processor 902 may be disposed in communication with a memory 905 (e.g., RAM 913, ROM 914, etc. as shown in FIG. 9) via a storage interface 904. The storage interface 904 may connect to memory 905 including, without limitation, memory drives, removable disc drives, etc., employing connection protocols such as serial advanced technology attachment (SATA), integrated drive electronics (IDE), IEEE-1394, universal serial bus (USB), fiber channel, Small Computer Systems Interface (SCSI), etc. The memory drives may further include a drum, magnetic disc drive, magneto-optical drive, optical drive, redundant array of independent discs (RAID), solid-state memory devices, solid-state drives, etc.

The memory 905 may store a collection of program or database components, including, without limitation, user/application interface 906, an operating system 907, a web browser 908, and the like. In some embodiments, computer system 900 may store user/application data, such as the data, variables, records, etc. as described in this disclosure. Such databases may be implemented as fault-tolerant, relational, scalable, secure databases such as Oracle® or Sybase®.

The operating system 907 may facilitate resource management and operation of the computer system 900. Examples of operating systems include, without limitation, APPLE® MACINTOSH® OS X®, UNIX®, UNIX-like system distributions (E.G., BERKELEY SOFTWARE DISTRIBUTION® (BSD), FREEBSD®, NETBSD®, OPENBSD, etc.), LINUX® DISTRIBUTIONS (E.G., RED HAT®, UBUNTU®, KUBUNTU®, etc.), IBM® OS/2®, MICROSOFT® WINDOWS® (XP®, VISTA®/7/8, 10 etc.), APPLE® IOS®, GOOGLE™ ANDROID™, BLACK-BERRY® OS, or the like.

The user/application interface 906 may facilitate display, execution, interaction, manipulation, or operation of program components through textual or graphical facilities. For example, the user/application interface 906 may provide computer interaction interface elements on a display system operatively connected to the computer system 900, such as cursors, icons, check boxes, menus, scrollers, windows, widgets, and the like. Further, Graphical User Interfaces (GUIs) may be employed, including, without limitation, APPLE® MACINTOSH® operating systems' Aqua®, IBM® OS/2®, MICROSOFT® WINDOWS® (e.g., Aero, Metro, etc.), web interface libraries (e.g., ActiveX, JAVA®, JAVASCRIPT®, AJAX, HTML, ADOBE® FLASH®, etc.), or the like.

The web browser 908 may be a hypertext viewing application. Secure web browsing may be provided using secure hypertext transport protocol (HTTPS), secure sockets layer (SSL), transport layer security (TLS), and the like. The web browsers 908 may utilize facilities such as AJAX, DHTML, ADOBE® FLASH®, JAVASCRIPT®, JAVA®, application programming interfaces (APIs), and the like. Further, the computer system 900 may implement a mail server stored program component. The mail server may utilize facilities such as AJAX, DHTML, ADOBE® FLASH®, JAVASCRIPT®, JAVA®, application programming interfaces (APIs), and the like. Further, the computer system 900 may implement a mail server stored program component. The mail server may utilize facilities such as ASP, ACTIVEX®, ANSI® C++/C#, MICROSOFT®, .NET, CGI SCRIPTS, JAVA®, JAVASCRIPT®, PERL®, PHP, PYTHON®, WEBOBJECTS®, etc. The mail server may utilize communication protocols such as internet message access protocol (IMAP), messaging application programming interface (MAPI), MICROSOFT® exchange, post office protocol (POP), simple mail transfer protocol (SMTP), or the like. In some embodiments, the computer system 900 may implement a mail client stored program component. The mail client may be a mail viewing application, such as APPLE® MAIL, MICROSOFT® ENTOURAGE®, MICROSOFT® OUTLOOK®, MOZILLA® THUNDERBIRD®, and the like.

Furthermore, one or more non-transitory computer-readable storage media may be utilized in implementing embodiments consistent with the disclosure. A non-transitory computer-readable storage medium refers to any type of physical memory on which information or data readable by a processor may be stored. Thus, a non-transitory computer-readable storage medium may store instructions for execution by one or more processors, including instructions for causing the processor(s) to perform steps or stages consistent with the embodiments described herein. The term "non-transitory computer-readable medium" should be understood to include tangible items and exclude carrier waves and transient signals, i.e., non-transitory. Examples include random access memory (RAM), read-only memory (ROM), volatile memory, nonvolatile memory, hard drives, compact disc (CD) ROMs, digital video disc (DVDs), flash drives, disks, and any other known physical storage media.

Advantages of the embodiments of the disclosure are illustrated herein.

In an embodiment, the method of disclosure helps in execution and partition of DNN inference (i.e., the layer) in IoT devices.

In an embodiment, the method of disclosure helps in reliable network switching among the available networks based on the network condition.

In an embodiment, the method of disclosure helps in optimal splitting of DNN between the IoT device and the edge device.

In an embodiment, the method of disclosure helps in overcoming the incompatibility associated with remotely deployed cloud due to latency constraints and unreliable connectivity during poor network conditions by deploying the DNN to edge devices in the close proximity of IoT devices and splitting the DNN among the IoT and edge devices using dynamic split computing (DSC).

In an embodiment, the RCNS mechanism helps in switching the networks among the available networks during poor network conditions.

As stated above, it shall be noted that the method of the disclosure may be used to overcome various technical problems related to execution of DNN in an IoT-edge network. In other words, the disclosed method has a practical application and provide a technically advanced solution to the technical problems associated with the existing approach into execution of DNN in an IoT device.

In light of the technical advancements provided by the disclosed method, the claimed steps, as discussed above, are not routine, conventional, or well-known aspects in the art, as the claimed steps provide the aforesaid solutions to the technical problems existing in the conventional technologies. Further, the claimed steps clearly bring an improvement in the functioning of the system itself, as the claimed steps provide a technical solution to a technical problem.

The terms "an embodiment", "embodiment", "embodiments", "the embodiment", "the embodiments", "one or more embodiments", "some embodiments", and "one embodiment" mean "one or more (but not all) embodiments of the disclosure(s)" unless expressly specified otherwise.

The terms "including", "comprising", "having" and variations thereof mean "including but not limited to", unless expressly specified otherwise.

The enumerated listing of items does not imply that any or all the items are mutually exclusive, unless expressly specified otherwise. The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the disclosure.

When a single device or article is described herein, it will be clear that more than one device/article (whether they cooperate) may be used in place of a single device/article. Similarly, where more than one device/article is described herein (whether they cooperate), it will be clear that a single device/article may be used in place of the more than one device/article or a different number of devices/articles may be used instead of the shown number of devices or programs. The functionality and/or features of a device may be alternatively embodied by one or more other devices which are not explicitly described as having such functionality/features. Thus, other embodiments of disclosure need not include the device itself.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based here on. Accordingly, the embodiments of the disclosure are intended to be illustrative, but not limiting, of the scope of the disclosure, which is set forth in the following claims.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for execution of a deep neural network (DNN) in an internet of things (IoT)-edge network, the method comprising:
   selecting, by an IoT device, at least one edge device from a plurality of edge devices within communication range of the IoT device to offload computations related to at least one DNN layer of a plurality of DNN layers, wherein the plurality of edge devices are devices having a higher computing capability than the IoT device;
   identifying, by the IoT device, a network for connecting the IoT device with the selected at least one edge device;
   determining, by the IoT device, a split ratio for splitting a computation task based on at least one of an inference time of the DNN and a transmission time required for transmitting output of each layer of the DNN from the IoT device to the selected at least one edge device;
   splitting, by the IoT device, the plurality of DNN layers into a first part and a second part based on the determined split ratio; and
   transmitting the second part to the selected at least one edge device through the network,
   wherein computation task of the first part is executed on the IoT device and computation task of the second part is executed on the selected at least one edge device.

2. The method of claim 1, wherein the selecting of the at least one edge device comprises selecting the at least one edge device from the plurality of edge devices based on network conditions and computational latency associated with the plurality of edge devices.

3. The method of claim 1, wherein the identifying of the network comprises identifying the network from a plurality of networks associated with the IoT device based on available bandwidth and historical inference time records of the plurality of networks.

4. The method of claim 1, wherein the identifying of the network comprises identifying the network based on at least one of a rule based reliable network switching, learning based reliable network switching, or manual network switching.

5. The method of claim 4, wherein the learning based reliable network switching comprises:
   training a machine learning model based on bandwidth data related to a plurality of networks; and
   selecting one of the plurality of networks using the trained machine learning model by analyzing time taken by each of the plurality of networks to complete a reference DNN inference.

6. The method of claim 4, wherein the rule based reliable network switching is used to identify a network having highest bandwidth availability as the network for connecting the IoT device with the selected at least one edge device.

7. The method of claim 1, wherein the split ratio is further determined based on one or more inference parameters comprising:
   a predetermined computation time of each layer of the DNN on the IoT device obtained by benchmarking the DNN on the IoT device;
   a predetermined computation time of each layer of the DNN on the selected at least one edge device obtained by benchmarking the DNN on the selected at least one edge device; and throughput of the identified network determined based on a response time of a message sent from the IoT device to the selected at least one edge device.

8. The method of claim 7, wherein the throughput of the identified network is re-computed periodically.

9. The method of claim 7, wherein the determined split ratio is modified based on variations in the one or more inference parameters.

10. An Internet of Things (IoT) device for execution of a deep neural network (DNN) in an IoT-edge network, the IoT device comprising:
a transceiver;
at least one processor; and
a memory, communicatively coupled to the processor, wherein the memory stores processor-executable instructions which, when executed by the at least one processor, cause the at least one processor to:
select at least one edge device from a plurality of edge devices within communication range of the IoT device to offload computations related to at least one DNN layer of a plurality of DNN layers, wherein the plurality of edge devices are devices having a higher computing capability than the IoT device,
identify a network for connecting the IoT device with the selected at least one edge device,
determine a split ratio for splitting a computation task based on at least one of an inference time of the DNN and a transmission time required for transmitting output of each layer of the DNN from the IoT device to the selected at least one edge device,
split the plurality of layers of the DNN into a first part and a second part based on the determined split ratio, and
control the transceiver to transmit the second part to the selected at least one edge device through the network,
wherein computation task of the first part is executed on the IoT device and computation task of the second part is executed on the selected at least one edge device.

11. The IoT device of claim 10, wherein the processor-executable instructions, when executed by the at least one processor, further cause the at least one processor to:
select the at least one edge device from the plurality of edge devices based on network conditions and computational latency associated with the plurality of edge devices.

12. The IoT device of claim 10, wherein the processor-executable instructions, when executed by the at least one processor, further cause the at least one processor to:
identify the network from a plurality of networks associated with the IoT device based on available bandwidth and historical inference time records of the plurality of networks.

13. The IoT device of claim 10, wherein the processor-executable instructions, when executed by the at least one processor, further cause the at least one processor to:
identify the network based on at least one of a rule based reliable network switching, learning based reliable network switching, or manual network switching.

14. The IoT device of claim 13, wherein the learning based reliable network switching comprises:
training a machine learning model based on bandwidth data related to a plurality of networks; and
selecting one of the plurality of networks using the trained machine learning model by analyzing time taken by each of the plurality of networks to complete a reference DNN inference.

15. The IoT device of claim 13, wherein the rule based reliable network switching is used to identify a network having highest bandwidth availability as the network for connecting the IoT device with the selected at least one edge device.

16. The IoT device of claim 10, wherein the split ratio is further determined based on one or more inference parameters comprising:
a predetermined computation time of each layer of the DNN on the IoT device obtained by benchmarking the DNN on the IoT device;
a predetermined computation time of each layer of the DNN on the selected at least one edge device obtained by benchmarking the DNN on the selected at least one edge device; and
throughput of the identified network determined based on a response time of a message sent from the IoT device to the selected at least one edge device.

17. The IoT device of claim 16, wherein the throughput of the identified network is re-computed periodically.

18. The IoT device of claim 16, wherein the determined split ratio is modified based on variations in the one or more inference parameters.

19. A non-transitory computer readable storage medium storing one or more programs, the one or more programs comprising instructions which, when executed by at least one processor of an electronic device, cause the electronic device to:
select at least one edge device from a plurality of edge devices within communication range of the electronic device to offload computations related to at least one deep neural network (DNN) layer of a plurality of DNN layers, wherein the plurality of edge devices are devices having a higher computing capability than the electronic device;
identify a network for connecting the electronic device with the selected at least one edge device;
determine a split ratio for splitting a computation task based on at least one of an inference time of a DNN and a transmission time required for transmitting output of each layer of the DNN from the electronic device to the selected at least one edge device;
split the plurality of layers of the DNN into a first part and a second part based on the determined split ratio; and
control a transceiver to transmit the second part to the selected at least one edge device through the network,
wherein computation task of the first part is executed on the electronic device and computation task of the second part is executed on the selected at least one edge device.

* * * * *